(12) United States Patent
Foster et al.

(10) Patent No.: US 10,072,737 B2
(45) Date of Patent: Sep. 11, 2018

(54) MULTI-SPEED TRANSMISSION

(71) Applicant: Allison Transmission, Inc., Indianapolis, IN (US)

(72) Inventors: Michael Foster, Carmel, IN (US); Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 15/841,415

(22) Filed: Dec. 14, 2017

(65) Prior Publication Data

US 2018/0106337 A1    Apr. 19, 2018

Related U.S. Application Data

(62) Division of application No. 14/695,181, filed on Apr. 24, 2015, now Pat. No. 9,890,835.

(51) Int. Cl.
*F16H 3/66* (2006.01)

(52) U.S. Cl.
CPC ....... *F16H 3/666* (2013.01); *F16H 2200/006* (2013.01); *F16H 2200/2012* (2013.01); *F16H 2200/2043* (2013.01)

(58) Field of Classification Search
CPC ...... F16H 3/66; F16H 3/666; F16H 2200/006; F16H 2200/2012; F16H 2200/2043
See application file for complete search history.

(56) References Cited

U.S. PATENT DOCUMENTS

| | | |
|---|---|---|
| 6,176,803 B1 | 1/2001 | Meyer et al. |
| 6,910,985 B2 | 6/2005 | Ishimaru et al. |
| 6,955,627 B2 | 10/2005 | Thomas et al. |
| 6,984,187 B2 | 1/2006 | Biermann |
| 7,101,305 B2 | 9/2006 | Tabata et al. |
| 7,226,381 B2 | 6/2007 | Klemen |
| 7,429,230 B2 | 9/2008 | Ziemer |
| 7,549,942 B2 | 6/2009 | Gumpoltsberger |
| 7,556,582 B2 | 7/2009 | Gumpoltsberger |
| 7,566,283 B2 | 7/2009 | Gumpoltsberger |
| 7,575,533 B2 | 8/2009 | Gumpoltsberger |
| 7,632,206 B2 | 12/2009 | Gumpoltsberger |
| 7,651,431 B2 | 1/2010 | Phillips et al. |
| 7,674,200 B2 | 3/2010 | Shim |
| 7,686,730 B2 | 3/2010 | Baldwin |
| 7,691,022 B2 | 4/2010 | Phillips et al. |
| 7,691,024 B2 | 4/2010 | Phillips et al. |
| 7,695,398 B2 | 4/2010 | Phillips et al. |

(Continued)

*Primary Examiner* — Edwin Young
(74) *Attorney, Agent, or Firm* — Taft Stettinus & Hollister LLP; Stephen F. Rost

(57) ABSTRACT

A multiple speed transmission having an input member, an output member, a plurality of planetary gearsets, a plurality of interconnecting members and a plurality of torque-transmitting mechanisms. The plurality of planetary gear sets includes first, second and ring gears. The input member is continuously interconnected with at least one member of one of the plurality of planetary gear sets, and the output member is continuously interconnected with another member of one of the plurality of planetary gear sets. At least eight forward speeds and one reverse speed are achieved by the selective engagement of the five torque-transmitting mechanisms.

20 Claims, 14 Drawing Sheets

(56) References Cited

U.S. PATENT DOCUMENTS

| | | |
|---|---|---|
| 7,704,181 B2 | 4/2010 | Phillips et al. |
| 7,722,496 B2 | 5/2010 | Phillips et al. |
| 7,727,104 B2 | 6/2010 | Shim |
| 7,731,625 B2 | 6/2010 | Phillips et al. |
| 7,736,263 B2 | 6/2010 | Phillips et al. |
| 7,753,820 B2 | 7/2010 | Phillips et al. |
| 7,771,306 B2 | 8/2010 | Phillips et al. |
| 7,828,690 B2 | 11/2010 | Wittkopp et al. |
| 7,841,960 B2 | 11/2010 | Baldwin |
| 7,846,057 B2 | 12/2010 | Shim |
| 7,846,058 B2 | 12/2010 | Shim |
| 7,850,568 B2 | 12/2010 | Shim |
| 7,850,569 B2 | 12/2010 | Seo et al. |
| 7,887,454 B2 | 2/2011 | Phillips et al. |
| 7,909,729 B2 | 3/2011 | Tanaka et al. |
| 7,914,414 B2 | 3/2011 | Phillips et al. |
| 7,946,948 B2 | 5/2011 | Phillips et al. |
| 7,980,988 B2 | 7/2011 | Phillips et al. |
| 7,985,159 B2 | 7/2011 | Phillips et al. |
| 7,988,586 B2 | 8/2011 | Phillips et al. |
| 7,993,235 B2 | 8/2011 | Wittkopp et al. |
| 7,993,237 B2 | 8/2011 | Wittkopp et al. |
| 7,993,238 B2 | 8/2011 | Phillips et al. |
| 7,998,013 B2 | 8/2011 | Phillips et al. |
| 8,001,662 B1 | 8/2011 | Guber |
| 8,002,662 B2 | 8/2011 | Phillips et al. |
| 8,007,394 B2 | 8/2011 | Phillips et al. |
| 8,007,395 B2 | 8/2011 | Wittkopp et al. |
| 8,007,398 B2 | 8/2011 | Phillips et al. |
| 8,016,713 B2 | 9/2011 | Phillips et al. |
| 8,033,948 B2 | 10/2011 | Phillips et al. |
| 8,038,565 B2 | 10/2011 | Phillips et al. |
| 8,038,566 B2 | 10/2011 | Phillips et al. |
| 8,043,189 B2 | 10/2011 | Phillips et al. |
| 8,043,192 B2 | 10/2011 | Wittkopp et al. |
| 8,047,950 B2 | 11/2011 | Wittkopp et al. |
| 8,047,951 B2 | 11/2011 | Wittkopp et al. |
| 8,047,954 B2 | 11/2011 | Phillips et al. |
| 8,052,566 B2 | 11/2011 | Wittkopp et al. |
| 8,052,567 B2 | 11/2011 | Hart et al. |
| 8,057,349 B2 | 11/2011 | Phillips et al. |
| 8,070,646 B2 | 12/2011 | Hart et al. |
| 8,079,932 B2 | 12/2011 | Phillips et al. |
| 8,088,032 B2 | 1/2012 | Gumpoltsberger et al. |
| 8,096,915 B2 | 1/2012 | Wittkopp et al. |
| 8,100,808 B2 | 1/2012 | Wittkopp et al. |
| 8,105,198 B2 | 1/2012 | Hart et al. |
| 8,128,527 B2 | 3/2012 | Hart et al. |
| 8,142,324 B2 | 3/2012 | Phillips et al. |
| 8,142,325 B2 | 3/2012 | Phillips et al. |
| 8,152,681 B2 | 4/2012 | Seo et al. |
| 8,157,697 B2 | 4/2012 | Hart et al. |
| 8,167,765 B2 | 5/2012 | Phillips et al. |
| 8,167,766 B2 | 5/2012 | Phillips et al. |
| 8,187,130 B1 | 5/2012 | Mellet et al. |
| 8,187,137 B2 | 5/2012 | Carey et al. |
| 8,197,376 B2 | 6/2012 | Gumpoltsberger et al. |
| 8,202,190 B2 | 6/2012 | Phillips et al. |
| 8,206,257 B2 | 6/2012 | Gumpoltsberger et al. |
| 8,210,981 B2 | 7/2012 | Bauknecht et al. |
| 8,210,982 B2 | 7/2012 | Gumpoltsberger et al. |
| 8,210,983 B2 | 7/2012 | Gumpoltsberger et al. |
| 8,231,495 B2 | 7/2012 | Gumpoltsberger et al. |
| 8,231,496 B2 | 7/2012 | Gumpoltsberger et al. |
| 8,231,501 B2 | 7/2012 | Gumpoltsberger et al. |
| 8,241,170 B2 | 8/2012 | Gumpoltsberger et al. |
| 8,241,171 B2 | 8/2012 | Gumpoltsberger et al. |
| 8,246,504 B2 | 8/2012 | Gumpoltsberger et al. |
| 8,251,856 B2 | 8/2012 | Phillips et al. |
| 8,251,857 B1 | 8/2012 | Mellet et al. |
| 8,251,859 B2 | 8/2012 | Gurpoltsberger et al. |
| 8,277,355 B2 | 10/2012 | Hart et al. |
| 8,287,420 B2 | 10/2012 | Gumpoltsberger et al. |
| 8,303,453 B2 | 11/2012 | Wittkopp et al. |
| 8,303,455 B2 | 11/2012 | Gumpoltsberger et al. |
| 8,303,456 B2 | 11/2012 | Kim |
| 8,328,678 B2 | 12/2012 | Seo et al. |
| 8,328,679 B2 | 12/2012 | Jang et al. |
| 8,333,676 B2 | 12/2012 | Kim |
| 8,343,005 B2 | 1/2013 | Hart et al. |
| 8,366,580 B2 | 2/2013 | Wittkopp et al. |
| 8,371,982 B2 | 2/2013 | Lee et al. |
| 8,376,893 B2 | 2/2013 | Wittkopp et al. |
| 8,376,895 B2 | 2/2013 | Saitoh et al. |
| 8,382,634 B2 | 2/2013 | Beck et al. |
| 8,398,522 B2 | 3/2013 | Bauknecht et al. |
| 8,403,803 B2 | 3/2013 | Gumpoltsberger et al. |
| 8,409,047 B2 | 4/2013 | Borgerson et al. |
| 8,414,445 B2 | 4/2013 | Carey et al. |
| 8,414,446 B2 | 4/2013 | Beck et al. |
| 8,419,587 B2 | 4/2013 | Gumpoltsberger et al. |
| 8,425,367 B2 | 4/2013 | Phillips et al. |
| 8,425,368 B2 | 4/2013 | Phillips et al. |
| 8,425,369 B2 | 4/2013 | Wittkopp et al. |
| 8,425,370 B2 | 4/2013 | Leesch et al. |
| 8,430,784 B2 | 4/2013 | Hart et al. |
| 8,430,785 B2 | 4/2013 | Beck et al. |
| 8,435,153 B2 | 5/2013 | Phillips et al. |
| 8,444,524 B2 | 5/2013 | Gumpoltsberger et al. |
| 8,444,525 B2 | 5/2013 | Gumpoltsberger et al. |
| 8,460,151 B2 | 6/2013 | Wittkopp et al. |
| 8,465,390 B2 | 6/2013 | Brehmer et al. |
| 8,480,533 B2 | 7/2013 | Meyer et al. |
| 8,485,934 B2 | 7/2013 | Gumpoltsberger et al. |
| 8,496,558 B2 | 7/2013 | Wittkopp et al. |
| 8,506,442 B2 | 8/2013 | Meliet et al. |
| 8,512,196 B2 | 8/2013 | Mellet et al. |
| 8,523,729 B2 | 9/2013 | Hart et al. |
| 8,529,394 B2 | 9/2013 | Gumpoltsberger et al. |
| 8,529,395 B2 | 9/2013 | Wittkopp et al. |
| 8,529,396 B1 | 9/2013 | Vernon et al. |
| 8,545,362 B1 | 10/2013 | Goleski et al. |
| 8,556,766 B2 | 10/2013 | Mellet et al. |
| 8,556,768 B2 | 10/2013 | Park et al. |
| 8,574,113 B1 | 11/2013 | Goleski |
| 8,574,114 B2 | 11/2013 | Brehmer et al. |
| 8,591,364 B2 | 11/2013 | Hart |
| 8,591,377 B1 | 11/2013 | Hoffman et al. |
| 8,597,152 B2 | 12/2013 | Seo et al. |
| 8,597,153 B2 | 12/2013 | Saitoh et al. |
| 8,602,934 B2 | 12/2013 | Mellet et al. |
| 8,608,612 B2 | 12/2013 | Park et al. |
| 8,617,022 B1 | 12/2013 | Vernon et al. |
| 8,636,617 B2 | 1/2014 | Singh |
| 8,636,618 B2 | 1/2014 | Hart et al. |
| 8,647,227 B2 | 2/2014 | Park et al. |
| 8,663,053 B2 | 3/2014 | Beck et al. |
| 8,663,056 B2 | 3/2014 | Gumpoltsberger et al. |
| 8,678,972 B2 | 3/2014 | Wittkopp et al. |
| 8,702,554 B2 | 4/2014 | Gumpoltsberger et al. |
| 8,702,555 B1 | 4/2014 | Hart et al. |
| 8,708,862 B2 | 4/2014 | Park |
| 8,721,488 B2 | 5/2014 | Mellet et al. |
| 8,721,492 B2 | 5/2014 | Fellmann et al. |
| 8,727,929 B2 | 5/2014 | Beck et al. |
| 8,734,285 B2 | 5/2014 | Wilton et al. |
| 8,734,286 B2 | 5/2014 | Coffey et al. |
| 8,758,187 B2 | 6/2014 | Mellet et al. |
| 8,758,189 B2 | 6/2014 | Hart et al. |
| 8,777,797 B2 | 7/2014 | Mellet et al. |
| 8,777,798 B2 | 7/2014 | Borgerson et al. |
| 8,801,563 B2 | 8/2014 | Ohnemus et al. |
| 8,801,565 B2 | 8/2014 | Hart et al. |
| 8,821,336 B2 | 9/2014 | Wilton et al. |
| 8,858,387 B2 | 10/2014 | Haupt et al. |
| 8,864,618 B1 | 10/2014 | Noh et al. |
| 8,888,648 B2 | 11/2014 | Mellet et al. |
| 8,894,535 B2 | 11/2014 | Mellet et al. |
| 8,915,819 B2 | 12/2014 | Coffey et al. |
| 8,920,281 B2 | 12/2014 | Mellet et al. |
| 8,939,863 B2 | 1/2015 | Hart et al. |
| 8,951,160 B2 | 2/2015 | Vernon et al. |
| 8,961,355 B2 | 2/2015 | Hart et al. |
| 8,961,356 B2 | 2/2015 | Bockanstette et al. |

(56) References Cited

U.S. PATENT DOCUMENTS

| | | | |
|---|---|---|---|
| 8,968,142 B2 | 3/2015 | Lippert | |
| 8,968,144 B2 | 3/2015 | Janson et al. | |
| 2006/0205556 A1 | 9/2006 | Klemen | |
| 2006/0223666 A1 | 10/2006 | Gumpoltsberger | |
| 2007/0207891 A1 | 9/2007 | Gumpoltsberger | |
| 2007/0213168 A1 | 9/2007 | Gumpoltsberger | |
| 2007/0232437 A1* | 10/2007 | Kamm | F16H 3/666 475/275 |
| 2008/0009384 A1* | 1/2008 | Diosi | F16H 3/66 475/282 |
| 2008/0064556 A1* | 3/2008 | Kamm | F16H 3/666 475/276 |
| 2008/0070740 A1 | 3/2008 | Gumpoltsberger | |
| 2008/0125269 A1 | 5/2008 | Gumpoltsberger | |
| 2008/0300092 A1 | 12/2008 | Phillips et al. | |
| 2009/0011891 A1 | 1/2009 | Phillips et al. | |
| 2009/0017964 A1 | 1/2009 | Phillips et al. | |
| 2009/0017965 A1 | 1/2009 | Phillips et al. | |
| 2009/0017966 A1 | 1/2009 | Phillips et al. | |
| 2009/0017971 A1 | 1/2009 | Phillips et al. | |
| 2009/0017976 A1 | 1/2009 | Phillips et al. | |
| 2009/0017977 A1 | 1/2009 | Phillips et al. | |
| 2009/0017979 A1 | 1/2009 | Phillips et al. | |
| 2009/0017980 A1 | 1/2009 | Phillips et al. | |
| 2009/0036253 A1 | 2/2009 | Phillips et al. | |
| 2009/0048059 A1 | 2/2009 | Phillips et al. | |
| 2009/0048062 A1 | 2/2009 | Seo et al. | |
| 2009/0054196 A1 | 2/2009 | Phillips et al. | |
| 2009/0118059 A1 | 5/2009 | Phillips et al. | |
| 2009/0118062 A1 | 5/2009 | Phillips et al. | |
| 2009/0124448 A1 | 5/2009 | Wittkopp et al. | |
| 2009/0192009 A1 | 7/2009 | Phillips et al. | |
| 2009/0192010 A1 | 7/2009 | Wittkopp et al. | |
| 2009/0192011 A1 | 7/2009 | Phillips et al. | |
| 2009/0192012 A1 | 7/2009 | Phillips et al. | |
| 2009/0197733 A1 | 8/2009 | Phillips et al. | |
| 2009/0197734 A1 | 8/2009 | Phillips et al. | |
| 2009/0209387 A1 | 8/2009 | Phillips et al. | |
| 2009/0209389 A1 | 8/2009 | Phillips et al. | |
| 2009/0215580 A1 | 8/2009 | Hart et al. | |
| 2009/0280947 A1 | 11/2009 | Seo et al. | |
| 2010/0041508 A1 | 2/2010 | Gumpoltsberger et al. | |
| 2010/0041509 A1 | 2/2010 | Gumpoltsberger et al. | |
| 2010/0069195 A1 | 3/2010 | Baldwin | |
| 2010/0190600 A1 | 7/2010 | Phillips et al. | |
| 2010/0210392 A1 | 8/2010 | Hart et al. | |
| 2010/0210393 A1 | 8/2010 | Phillips et al. | |
| 2010/0210394 A1 | 8/2010 | Phillips et al. | |
| 2010/0210395 A1 | 8/2010 | Phillips et al. | |
| 2010/0210396 A1 | 8/2010 | Wittkopp et al. | |
| 2010/0210397 A1 | 8/2010 | Wittkopp et al. | |
| 2010/0210398 A1 | 8/2010 | Hart et al. | |
| 2010/0210400 A1 | 8/2010 | Phillips et al. | |
| 2010/0210401 A1 | 8/2010 | Phillips et al. | |
| 2010/0210402 A1 | 8/2010 | Phillips et al. | |
| 2010/0210403 A1 | 8/2010 | Wittkopp et al. | |
| 2010/0210404 A1 | 8/2010 | Phillips et al. | |
| 2010/0210405 A1 | 8/2010 | Phillips et al. | |
| 2010/0210406 A1 | 8/2010 | Phillips et al. | |
| 2010/0216589 A1 | 8/2010 | Hart et al. | |
| 2010/0216590 A1 | 8/2010 | Phillips et al. | |
| 2010/0216591 A1 | 8/2010 | Wittkopp et al. | |
| 2010/0227729 A1 | 9/2010 | Wittkopp et al. | |
| 2010/0279814 A1 | 11/2010 | Brehmer et al. | |
| 2010/0331136 A1 | 12/2010 | Jang et al. | |
| 2011/0009229 A1 | 1/2011 | Bauknecht et al. | |
| 2011/0045936 A1 | 2/2011 | Gumpoltsberger et al. | |
| 2011/0045937 A1 | 2/2011 | Gumpoltsberger et al. | |
| 2011/0045938 A1 | 2/2011 | Gumpoltsberger et al. | |
| 2011/0045939 A1 | 2/2011 | Gumpoltsberger et al. | |
| 2011/0045940 A1 | 2/2011 | Gumpoltsberger et al. | |
| 2011/0045942 A1 | 2/2011 | Gumpoltsberger et al. | |
| 2011/0045943 A1 | 2/2011 | Gumpoltsberger et al. | |
| 2011/0124462 A1 | 5/2011 | Meyer et al. | |
| 2011/0136615 A1 | 6/2011 | Phillips et al. | |
| 2011/0183807 A1 | 7/2011 | Gumpoltsberger et al. | |
| 2011/0212806 A1 | 9/2011 | Phillips et al. | |
| 2011/0245013 A1 | 10/2011 | Kim | |
| 2011/0245026 A1 | 10/2011 | Phillips et al. | |
| 2011/0251014 A1 | 10/2011 | Leesch et al. | |
| 2011/0275472 A1 | 11/2011 | Phillips et al. | |
| 2011/0294617 A1 | 12/2011 | Seo et al. | |
| 2012/0004066 A1 | 1/2012 | See et al. | |
| 2012/0053004 A1 | 3/2012 | Beck et al. | |
| 2012/0053005 A1 | 3/2012 | Beck et al. | |
| 2012/0053008 A1 | 3/2012 | Beck et al. | |
| 2012/0058856 A1 | 3/2012 | Phillips et al. | |
| 2012/0065019 A1 | 3/2012 | Hart et al. | |
| 2012/0108382 A1 | 5/2012 | Saitoh et al. | |
| 2012/0108383 A1 | 5/2012 | Saitoh et al. | |
| 2012/0115671 A1 | 5/2012 | Gumpoltsberger et al. | |
| 2012/0115672 A1 | 5/2012 | Gumpoltsberger et al. | |
| 2012/0122626 A1 | 5/2012 | Gumpoltsberger et al. | |
| 2012/0122627 A1 | 5/2012 | Gumpoltsberger et al. | |
| 2012/0135834 A1 | 5/2012 | Gumpoltsberger et al. | |
| 2012/0135835 A1 | 5/2012 | Gumpoltsberger et al. | |
| 2012/0149525 A1 | 6/2012 | Gumpoltsberger et al. | |
| 2012/0149526 A1 | 6/2012 | Gumpoltsberger et al. | |
| 2012/0149527 A1 | 6/2012 | Gumpoltsberger et al. | |
| 2012/0172172 A1 | 7/2012 | Gumpoltsberger et al. | |
| 2012/0178564 A1 | 7/2012 | Vahabzadeh et al. | |
| 2012/0178572 A1 | 7/2012 | Hart | |
| 2012/0178579 A1 | 7/2012 | Wittkopp et al. | |
| 2012/0178580 A1 | 7/2012 | Wittkopp et al. | |
| 2012/0178581 A1 | 7/2012 | Wittkopp et al. | |
| 2012/0178582 A1 | 7/2012 | Wittkopp et al. | |
| 2012/0196718 A1 | 8/2012 | Hart et al. | |
| 2012/0214632 A1 | 8/2012 | Mellet et al. | |
| 2012/0214633 A1 | 8/2012 | Mellet et al. | |
| 2012/0214636 A1 | 8/2012 | Hart et al. | |
| 2012/0214637 A1 | 8/2012 | Hart et al. | |
| 2012/0214638 A1 | 8/2012 | Hart et al. | |
| 2012/0231917 A1 | 9/2012 | Phillips et al. | |
| 2012/0231920 A1 | 9/2012 | Wittkopp et al. | |
| 2012/0295754 A1 | 11/2012 | Hart et al. | |
| 2012/0329600 A1 | 12/2012 | Park et al. | |
| 2013/0029799 A1 | 1/2013 | Park et al. | |
| 2013/0040776 A1 | 2/2013 | Mellet et al. | |
| 2013/0085031 A1 | 4/2013 | Bassi et al. | |
| 2013/0085032 A1 | 4/2013 | Mellet et al. | |
| 2013/0085033 A1 | 4/2013 | Wittkopp et al. | |
| 2013/0150203 A1 | 6/2013 | Park et al. | |
| 2013/0150204 A1 | 6/2013 | Park et al. | |
| 2013/0187796 A1 | 7/2013 | Kim et al. | |
| 2013/0203549 A1 | 8/2013 | Mellet et al. | |
| 2013/0225357 A1* | 8/2013 | Etchason | F16H 3/66 475/269 |
| 2013/0237365 A1 | 9/2013 | Coffey et al. | |
| 2013/0252780 A1 | 9/2013 | Ohnemus et al. | |
| 2013/0260949 A1* | 10/2013 | Fellmann | F16H 3/66 475/317 |
| 2013/0310211 A1 | 11/2013 | Wilton et al. | |
| 2014/0378269 A1* | 12/2014 | Bockenstette | F16H 3/66 475/276 |
| 2016/0356345 A1 | 12/2016 | Ji et al. | |
| 2016/0363188 A1 | 12/2016 | Kook et al. | |
| 2017/0074363 A1 | 3/2017 | Park et al. | |
| 2017/0074368 A1 | 3/2017 | Park et al. | |
| 2017/0074370 A1 | 3/2017 | Kwon et al. | |

* cited by examiner

|     | B1 | B2 | C3 | C4 | C5 |
|-----|----|----|----|----|----|
| 1st | X  | X  | X  |    |    |
| 2nd | X  | X  |    |    | X  |
| 3rd |    | X  | X  |    | X  |
| 4th |    | X  |    | X  | X  |
| 5th | X  |    | X  | X  |    |
| 6th | X  |    | X  | X  | X  |
| 7th | X  | X  |    | X  |    |
| 8th |    |    |    | X  | X  |
| Rev | X  | X  |    | X  |    |

Fig. 13

|  | B1 | B2 | C3 | C4 | C5 |
|---|---|---|---|---|---|
| 1st | X | X | X |  |  |
| 2nd | X | X |  | X |  |
| 3rd |  | X | X | X |  |
| 4th |  | X | X | X | X |
| 5th | X |  | X |  | X |
| 6th | X |  | X | X | X |
| 7th | X |  |  |  | X |
| 8th | X | X |  | X | X |
| Rev | X | X |  |  | X |

Fig. 14

MULTI-SPEED TRANSMISSION

RELATED APPLICATIONS

The present application is a divisional application of U.S. patent application Ser. No. 14/695,181, filed Apr. 24, 2015, the disclosure of which is hereby incorporated by reference in its entirety.

FIELD OF THE DISCLOSURE

The present disclosure relates to a multiple speed transmission, and in particular to a multiple speed transmission capable of achieving eight or more speeds.

BACKGROUND

Multiple speed transmissions use a number of friction clutches or brakes, planetary gearsets, shafts, and other elements to achieve a plurality of gear or speed ratios. The architecture, i.e., packaging or layout of the aforementioned elements, is determined based on cost, size, packaging constraints, and desired ratios. There is a need for new architectural designs of multiple speed transmissions for achieving different ratios with improved performance, cost, efficiency, responsiveness, and packaging.

SUMMARY

In a first embodiment of the present disclosure, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the second member of the first planetary gearset with the stationary member; a third torque-transmitting mechanism selectively engageable to interconnect the second member of the second planetary gearset with the first member of the fourth planetary gearset and the third member of the third planetary gearset; a fourth torque-transmitting mechanism selectively engageable to interconnect the third member of the second planetary gearset with the first member of the third planetary gearset; and a fifth torque-transmitting mechanism selectively engageable to interconnect the third member of the second planetary gearset with the third member of the third planetary gearset and the first member of the fourth planetary gearset; wherein the torque transmitting mechanisms are selectively engageable in combinations of at least three to establish at least eight forward speed ratios and at least one reverse speed ratio between the input member and the output member.

In a second embodiment, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the second member of the first planetary gearset with the stationary member; a third torque-transmitting mechanism selectively engageable to interconnect the second member of the second planetary gearset with the first member of the fourth planetary gearset; a fourth torque-transmitting mechanism selectively engageable to interconnect the first member of the third planetary gearset with the first member of the fourth planetary gearset; and a fifth torque-transmitting mechanism selectively engageable to interconnect the third member of the second planetary gearset and the third member of the third planetary gearset with the first member of the fourth planetary gearset; wherein the torque transmitting mechanisms are selectively engageable in combinations of at least three to establish at least eight forward speed ratios and at least one reverse speed ratio between the input member and the output member.

In a third embodiment, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the second member of the first planetary gearset with the stationary member; a third torque-transmitting mechanism selectively engageable to interconnect the second member of the second planetary gearset with the first member of the fourth planetary gearset; a fourth torque-transmitting mechanism selectively engageable to interconnect the third member of the second planetary gearset and the first member of the third planetary gearset with the first member of the fourth planetary gearset; and a fifth torque-transmitting mechanism selectively engageable to interconnect the third member of the third planetary gearset with the first member of the fourth planetary gearset; wherein the torque transmitting mechanisms are selectively engageable in combinations of at least three to establish at least eight forward speed ratios and at least one reverse speed ratio between the input member and the output member.

In a fourth embodiment, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the second member of the first planetary gearset with the stationary member; a third torque-transmitting mechanism selectively engageable to interconnect the second member of the second planetary gearset with the first member of the fourth planetary gearset and the first member of the third planetary gearset; a fourth torque-transmitting mechanism selectively engageable to interconnect the third member of the second planetary gearset with the third member of the third planetary gearset;

and a fifth torque-transmitting mechanism selectively engageable to interconnect the third member of the second planetary gearset with the first member of the third planetary gearset and the first member of the fourth planetary gearset; wherein the torque transmitting mechanisms are selectively engageable in combinations of at least three to establish at least eight forward speed ratios and at least one reverse speed ratio between the input member and the output member.

In a fifth embodiment of the present disclosure, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the third member of the first planetary gearset with the stationary member; a third torque-transmitting mechanism selectively engageable to interconnect the third member of the second planetary gearset with the first member of the fourth planetary gearset and the third member of the third planetary gearset; a fourth torque-transmitting mechanism selectively engageable to interconnect the second member of the second planetary gearset with the first member of the third planetary gearset; and a fifth torque-transmitting mechanism selectively engageable to interconnect the second member of the second planetary gearset with the third member of the third planetary gearset and the first member of the fourth planetary gearset; wherein the torque transmitting mechanisms are selectively engageable in combinations of at least three to establish at least eight forward speed ratios and at least one reverse speed ratio between the input member and the output member.

In a sixth embodiment, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the third member of the first planetary gearset with the stationary member; a third torque-transmitting mechanism selectively engageable to interconnect the third member of the second planetary gearset with the first member of the fourth planetary gearset; a fourth torque-transmitting mechanism selectively engageable to interconnect the first member of the third planetary gearset with the first member of the fourth planetary gearset; and a fifth torque-transmitting mechanism selectively engageable to interconnect the second member of the second planetary gearset and the third member of the third planetary gearset with the first member of the fourth planetary gearset; wherein the torque transmitting mechanisms are selectively engageable in combinations of at least three to establish at least eight forward speed ratios and at least one reverse speed ratio between the input member and the output member.

In a seventh embodiment, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the third member of the first planetary gearset with the stationary member; a third torque-transmitting mechanism selectively engageable to interconnect the third member of the second planetary gearset with the first member of the fourth planetary gearset; a fourth torque-transmitting mechanism selectively engageable to interconnect the second member of the second planetary gearset and the first member of the third planetary gearset with the first member of the fourth planetary gearset; and a fifth torque-transmitting mechanism selectively engageable to interconnect the third member of the third planetary gearset with the first member of the fourth planetary gearset; wherein the torque transmitting mechanisms are selectively engageable in combinations of at least three to establish at least eight forward speed ratios and at least one reverse speed ratio between the input member and the output member.

In an eighth embodiment, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the third member of the first planetary gearset with the stationary member; a third torque-transmitting mechanism selectively engageable to interconnect the third member of the second planetary gearset with the first member of the third planetary gearset and the first member of the fourth planetary gearset; a fourth torque-transmitting mechanism selectively engageable to interconnect the second member of the second planetary gearset with the third member of the third planetary gearset; and a fifth torque-transmitting mechanism selectively engageable to interconnect the second member of the second planetary gearset with the first member of the third planetary gearset and the first member of the fourth planetary gearset; wherein the torque transmitting mechanisms are selectively engageable in combinations of at least three to establish at least eight forward speed ratios and at least one reverse speed ratio between the input member and the output member.

In a ninth embodiment, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the third member of the first planetary gearset with the stationary member; a third torque-transmitting mechanism selectively engageable to interconnect the second member of the second planetary gearset with the second member of the third planetary gearset and the first member of the fourth planetary gearset; a fourth torque-transmitting mechanism selectively engageable to interconnect the third member of the second planetary gearset with the first member of the third planetary gearset; and a fifth torque-transmitting mechanism selectively engageable to interconnect the third member of the second planetary gearset with the second member of the third planetary gearset and the first member of the fourth planetary gearset; wherein the torque transmitting mechanisms are selectively engageable in combinations of at least three to establish at least eight forward speed ratios and at least one reverse speed ratio between the input member and the output member.

In a tenth embodiment, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the third member of the first planetary gearset with the stationary member; a third torque-transmitting mechanism selectively engageable to interconnect the second member of the second planetary gearset with the first member of the fourth planetary gearset; a fourth torque-transmitting mechanism selectively engageable to interconnect the first member of the third planetary gearset with the first member of the fourth planetary gearset; and a fifth torque-transmitting mechanism selectively engageable to interconnect the third member of the second planetary gearset and the second member of the third planetary gearset with the first member of the fourth planetary gearset; wherein the torque transmitting mechanisms are selectively engageable in combinations of at least three to establish at least eight forward speed ratios and at least one reverse speed ratio between the input member and the output member.

In another embodiment of the present disclosure, a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the first planetary gearset and the first member of the second planetary gearset with a stationary member; a second torque-transmitting mechanism selectively engageable to interconnect the third member of the first planetary gearset with the stationary member; a third torque-transmitting mechanism selectively engageable to interconnect the second member of the second planetary gearset with the first member of the third planetary gearset and the first member of the fourth planetary gearset; a fourth torque-transmitting mechanism selectively engageable to interconnect the third member of the second planetary gearset with the second member of the third planetary gearset; and a fifth torque-transmitting mechanism selectively engageable to interconnect the third member of the second planetary gearset with the first member of the third planetary gearset and the first member of the fourth planetary gearset; wherein the torque transmitting mechanisms are selectively engageable in combinations of at least three to establish at least eight forward speed ratios and at least one reverse speed ratio between the input member and the output member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIGS. 13 and 14 are truth tables presenting examples of a state of engagement of various torque transmitting mechanisms in each of the available forward and reverse speeds or gear ratios of the transmissions illustrated in FIGS. 2-12.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
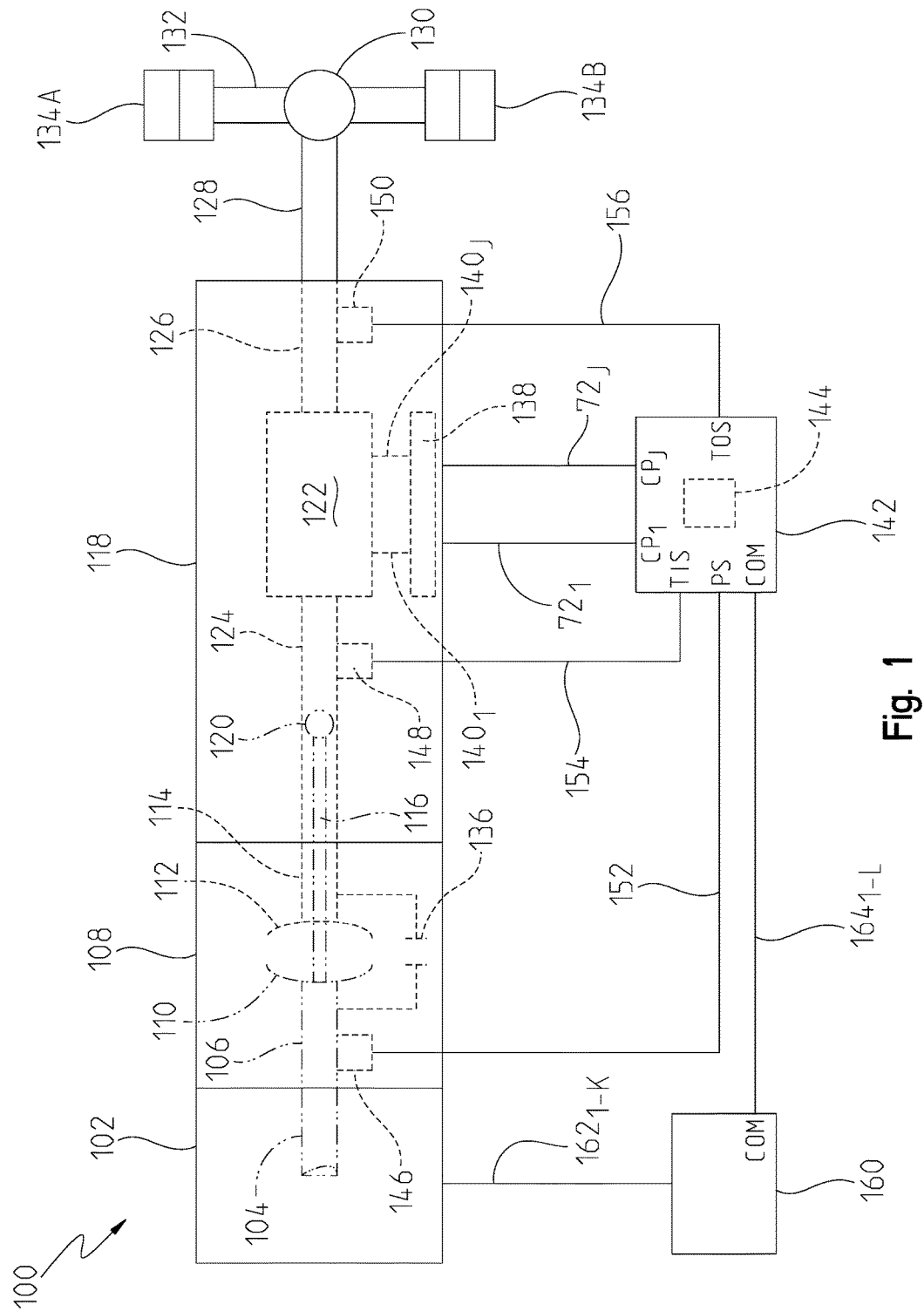
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_4$ and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
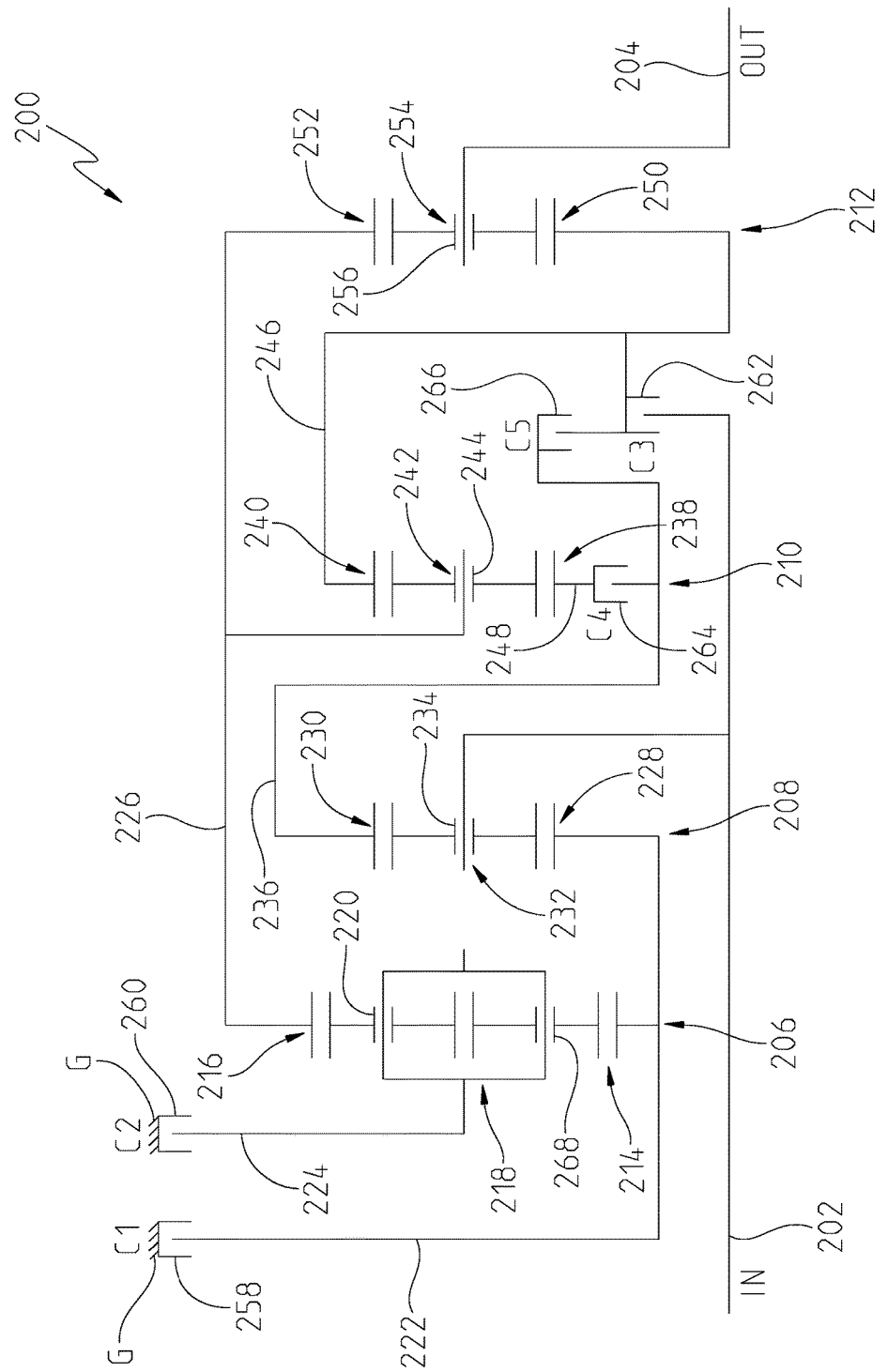
FIG. 2 is a diagrammatic view of a first embodiment of a multiple speed transmission.

Referring to FIG. 2, a schematic representation or stick diagram illustrates one embodiment of a multi-speed transmission 200 according to the present disclosure. The transmission 200 includes an input shaft 202 and an output shaft 204. The input shaft 202 and output shaft 204 can be disposed along the same axis or centerline of the transmission 200. In another aspect, the different shafts can be disposed along different axes or centerlines. In a further aspect, the different shafts can be disposed parallel to one another, but along different axes or centerlines. Other aspect can be appreciated by one skilled in the art.

The transmission 200 can also include a plurality of planetary gearsets. In the illustrated embodiment of FIG. 2, the transmission 200 includes a first planetary gearset 206, a second planetary gearset 208, a third planetary gearset 210, and a fourth planetary gearset 212. Each planetary gearset can be referred to as a simple or compound planetary gearset. For example, in some aspects, one or more of the plurality of planetary gearsets can be formed as an idler planetary gearset. In FIG. 2, for instance, the first planetary gearset 206 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 200, but for sake of simplicity and in this particular example only, the planetary gearsets are aligned in an axial direction consecutively in sequence (i.e., first, second, third, and fourth between the input and output shafts).

The transmission 200 may also include a plurality of torque-transmitting or gearshifting mechanisms. For example, one or more of these mechanisms can include a clutch or brake. In one aspect, each of the plurality of mechanisms is disposed within an outer housing of the transmission 200. In another aspect, however, one or more of the mechanisms may be disposed outside of the housing. Each of the plurality of mechanisms can be coupled to one or more of the plurality of planetary gearsets, which will be described further below.

In the embodiment of FIG. 2, the transmission 200 can include a first torque-transmitting mechanism 258 and a second torque-transmitting mechanism 260 that are configured to function as brakes (e.g., the torque-transmitting mechanism is fixedly coupled to the outer housing of the transmission 200). Each brake can be configured as a shiftable-friction-locked disk brake, shiftable friction-locked band brake, shiftable form-locking claw or conical brake, or any other type of known brake. The transmission 200 can include a third torque-transmitting mechanism 262, a fourth torque-transmitting mechanism 264, and a fifth torque-transmitting mechanism 266 that are configured to function as clutches. These can be shiftable friction-locked multi-disk clutches, shiftable form-locking claw or conical clutches, wet clutches, or any other known form of a clutch.

With these five torque-transmitting mechanisms, selective shifting of at least eight forward gears and at least one reverse gear is possible.

The transmission 200 of FIG. 2 may also include up to eight different shafts, which is inclusive of the input shaft 202 and output shaft 204. Each of these shafts, designated as a first shaft 222, a second shaft 224, a third shaft 226, a fourth shaft 236, a fifth shaft 246, and a sixth shaft 248, are configured to be connected to one or more of the plurality of planetary gearsets or plurality of torque-transmitting mechanism between the input shaft 202 and output shaft 204.

In FIG. 2, the first planetary gearset 206 i.e., the idler planet planetary gearset, can include a first sun gear 214, a first ring gear 216, and a first carrier member 218 supports two sets of pinion gears. One set of pinion gears 268 is rotationally coupled to the sun gear 214 and the other set of pinion gears 220 is rotationally coupled to the ring gear 216. The second planetary gearset 208 can include a second sun gear 228, a second ring gear 230, and a second carrier member 232 that rotatably supports a set of pinion gears 234. The third planetary gearset 210 can include a third sun gear 238, a third ring gear 240, and a third carrier member 242 that rotatably supports a set of pinion gears 244. The fourth planetary gearset 212 can include a fourth sun gear 250, a fourth ring gear 252, and a fourth carrier member 254 that rotatably supports a set of pinion gears 256.

The transmission 200 is capable of transferring torque from the input shaft 202 to the output shaft 204 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 258, 260, 262, 264, and 266). Those skilled in the art will readily understand that a different speed ratio is associated with each torque ratio. Thus, at least eight forward speed ratios and at least one reverse speed ratio may be attained by transmission 200.

As for the transmission 200, kinematic coupling of the first planetary gearset 206 is shown in FIG. 2. The first sun gear 214 is coupled to the first shaft 222 for common rotation therewith. The first carrier member 218 is coupled to the second shaft 224 for common rotation therewith. First ring gear 216 is coupled for common rotation with the third shaft 226.

With respect to the second planetary gearset 208, the second sun gear 228 is coupled to the first shaft 222 and first sun gear 214 for common rotation therewith. The second ring gear 230 is coupled to the third shaft 236 for common rotation therewith. Second pinion gears 234 are configured to intermesh with the second sun gear 228 and second ring gear 230, and the second carrier member 232 is coupled for common rotation with the input shaft 202.

The third sun gear 238 of the third planetary gearset 210 is coupled to the sixth shaft 248 for common rotation therewith. The third ring gear 240 is coupled to the fifth shaft 246, which is also coupled to the fourth sun gear 250, for common rotation therewith. Third pinion gears 244 are configured to intermesh with the third sun gear 238 and third ring gear 240, respectively. The third carrier member 242 is coupled for common rotation with the third shaft 226.

The kinematic relationship of the fourth planetary gearset 212 is such that the fourth sun gear 250 is coupled to the fifth shaft 246 and third ring gear 240 for common rotation therewith. The fourth ring gear 252 is coupled to the third shaft 226, first ring gear 216, and third carrier member 242 for common rotation therewith. The fourth pinion gears 256 are configured to intermesh with the fourth sun gear 250 and the fourth ring gear 252. The fourth carrier member 254 is coupled to the output shaft 204 for common rotation therewith.

With regards to the kinematic coupling of the five torque-transmitting mechanisms to the previously described shafts, the multiple speed transmission 200 of FIG. 2 provides that the first torque-transmitting mechanism 258 is arranged within the power flow between the first shaft 222 and a housing G of the transmission 200. In this manner, the first torque-transmitting mechanism 258 is configured to act as a brake. The second torque-transmitting mechanism 260 is arranged within the power flow between the second shaft 224 and the housing G of the transmission 200. In this manner, the second torque-transmitting mechanism 260 is configured to act as a brake. In this embodiment of the transmission 200 therefore two of the five torque-transmitting mechanisms are configured to act as a brake and the other three torque-transmitting mechanisms are configured to act as clutches.

The third torque-transmitting mechanism 262, for example, is arranged within the power flow between the input shaft 202 and the fifth shaft 246. The fourth torque-transmitting mechanism 264 is arranged within the power flow between the fourth shaft 236 and the sixth shaft 248. Moreover, the fifth torque-transmitting mechanism 266 is arranged within the power flow between the fourth shaft 236 and the fifth shaft 246.

The kinematic couplings of the embodiment in FIG. 2 can further be described with respect to the selective engagement of the torque-transmitting mechanisms with respect to one or more components of the plurality of planetary gearsets. For example, in the transmission 200, the first torque-transmitting mechanism 258 is selectively engageable to couple the first sun gear 214, the second sun gear 228, and the first shaft 222 to the housing G of the transmission 200. The second torque-transmitting mechanism 260 is selectively engageable to couple the first carrier member 218 and the second shaft 224 to the housing G of the transmission 200. Moreover, the third torque-transmitting mechanism 262 is selectively engageable to couple input shaft 202 and the second carrier member 232 to the fifth shaft 246, third ring gear 240 and fourth sun gear 250. The fourth torque-transmitting mechanism 264 is selectively engageable to couple fourth shaft 236 and second ring gear 230 to the third sun gear 238 and the sixth shaft 248. Lastly, the fifth torque-transmitting mechanism 266 is selectively engageable to couple the third ring gear 240, fourth sun gear 250, and the fifth shaft 246 to the second ring gear 230 and the fourth shaft 236.

Figure 3:
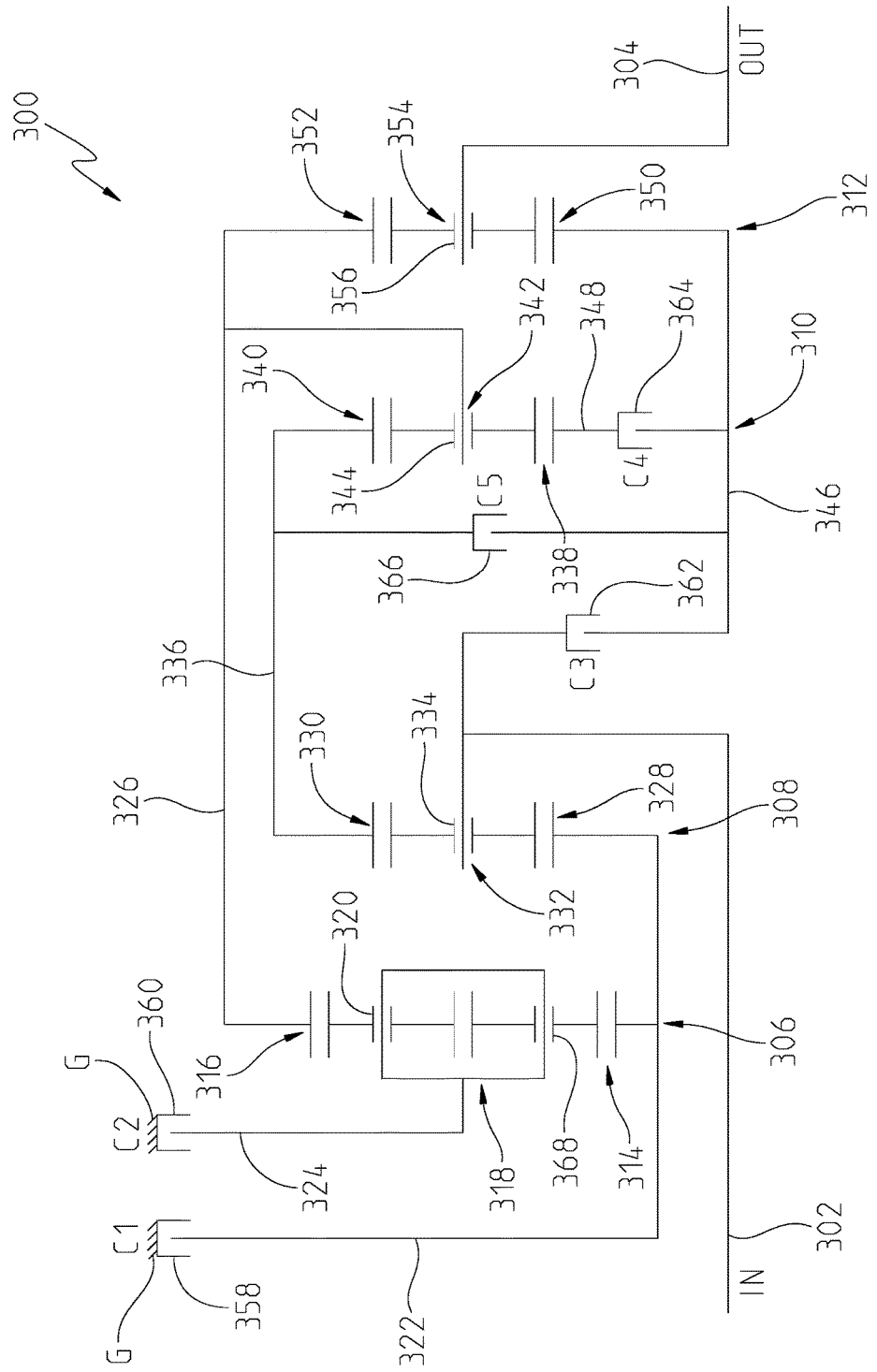
FIG. 3 is a diagrammatic view of a second embodiment of a multiple speed transmission.

Referring to FIG. 3, a schematic representation or stick diagram illustrates one embodiment of a multi-speed transmission 300 according to the present disclosure. The transmission 300 includes an input shaft 302 and an output shaft 304. The input shaft 302 and output shaft 304 can be disposed along the same axis or centerline of the transmission 300. In another aspect, the different shafts can be disposed along different axes or centerlines. In a further aspect, the different shafts can be disposed parallel to one another, but along different axes or centerlines. Other aspect can be appreciated by one skilled in the art.

The transmission 300 can also include a plurality of planetary gearsets. In the illustrated embodiment of FIG. 3, the transmission 300 includes a first planetary gearset 306, a second planetary gearset 308, a third planetary gearset 310, and a fourth planetary gearset 312. Each planetary gearset can be referred to as a simple or compound planetary gearset. For example, in some aspects, one or more of the plurality of planetary gearsets can be formed as an idler planetary gearset. In FIG. 3, for instance, the first planetary gearset 306 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 300, but for sake of simplicity and in this particular example only, the planetary gearsets are aligned in an axial direction consecutively in sequence (i.e., first, second, third, and fourth between the input and output shafts).

The transmission 300 may also include a plurality of torque-transmitting or gearshifting mechanisms. For example, one or more of these mechanisms can include a clutch or brake. In one aspect, each of the plurality of mechanisms is disposed within an outer housing of the transmission 300. In another aspect, however, one or more of the mechanisms may be disposed outside of the housing. Each of the plurality of mechanisms can be coupled to one or more of the plurality of planetary gearsets, which will be described further below.

In the embodiment of FIG. 3, the transmission 300 can include a first torque-transmitting mechanism 358 and a second torque-transmitting mechanism 360 that are configured to function as brakes (e.g., the torque-transmitting mechanism is fixedly coupled to the outer housing of the transmission 300). Each brake can be configured as a shiftable-friction-locked disk brake, shiftable friction-locked band brake, shiftable form-locking claw or conical brake, or any other type of known brake. The transmission 300 can include a third torque-transmitting mechanism 362, a fourth torque-transmitting mechanism 364, and a fifth torque-transmitting mechanism 366 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 300 of FIG. 3 may also include up to eight different shafts, which is inclusive of the input shaft 302 and output shaft 304. Each of these shafts, designated as a first shaft 322, a second shaft 324, a third shaft 326, a fourth shaft 336, a fifth shaft 346, and a sixth shaft 348, are configured to be connected to one or more of the plurality of planetary gearsets or plurality of torque-transmitting mechanism between the input shaft 302 and output shaft 304.

In FIG. 3, the first planetary gearset 306, i.e., the idler planetary gearset, can include a first sun gear 314, a first ring gear 316, and a first carrier member 318 that rotatably supports two sets of pinion gears 320. One set of pinion gears 368 is rotationally coupled to the sun gear 314 and the other set of pinion gears 320 is rotationally coupled to the ring gear 316. The second planetary gearset 308 can include a second sun gear 328, a second ring gear 330, and a second carrier member 332 that rotatably supports a set of pinion gears 334. The third planetary gearset 310 can include a third sun gear 338, a third ring gear 340, and a third carrier member 342 that rotatably supports a set of pinion gears 344. The fourth planetary gearset 312 can include a fourth sun gear 350, a fourth ring gear 352, and a fourth carrier member 354 that rotatably supports a set of pinion gears 356.

The transmission 300 is capable of transferring torque from the input shaft 302 to the output shaft 304 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 358, 360, 362, 364, and 366). Those skilled in the art will readily understand that a different speed ratio is associated with each torque ratio. Thus, at least eight forward speed ratios and at least one reverse speed ratio may be attained by transmission 300.

As for the transmission 300, kinematic coupling of the first planetary gearset 306 is shown in FIG. 3. The first sun gear 314 is coupled to the first shaft 322 for common rotation therewith. The first carrier member 318 is coupled to the second shaft 324 for common rotation therewith. First ring gear 316 is coupled for common rotation with the third shaft 326.

With respect to the second planetary gearset 308, the second sun gear 328 is coupled to the first shaft 322 and first sun gear 314 for common rotation therewith. The second ring gear 330 is coupled to the fourth shaft 336 for common rotation therewith. The second carrier member 332 is coupled for common rotation with the input shaft 302.

The third sun gear 338 of the third planetary gearset 310 is coupled to the sixth shaft 348 for common rotation therewith. The third ring gear 340 is coupled to the fourth shaft 336 for common rotation therewith. Third pinion gears 344 are configured to intermesh with the third sun gear 338 and third ring gear 340, respectively. The third carrier member 342 is coupled for common rotation with the third shaft 326, the first ring gear 316 and fourth ring gear 352.

The kinematic relationship of the fourth planetary gearset 312 is such that the fourth sun gear 350 is coupled to the fifth shaft 346 for common rotation therewith. The fourth ring gear 352 is coupled to the third shaft 326 for common rotation therewith. The fourth pinion gears 356 are configured to intermesh with the fourth sun gear 350 and the fourth ring gear 352. The fourth carrier member 354 is coupled to the output shaft 304 for common rotation therewith.

With regards to the kinematic coupling of the five torque-transmitting mechanisms to the previously described shafts, the multiple speed transmission 300 of FIG. 3 provides that the first torque-transmitting mechanism 358 is arranged within the power flow between the first shaft 322 and a housing G of the transmission 300. In this manner, the first torque-transmitting mechanism 358 is configured to act as a brake. The second torque-transmitting mechanism 360 is arranged within the power flow between the second shaft 324 and the housing G of the transmission 300. In this manner, the second torque-transmitting mechanism 360 is configured to act as a brake. In this embodiment of the transmission 300 therefore two of the five torque-transmitting mechanisms are configured to act as a brake and the other three torque-transmitting mechanisms are configured to act as clutches.

The third torque-transmitting mechanism 362, for example, is arranged within the power flow between the input shaft 302 and the fifth shaft 346. The fourth torque-transmitting mechanism 364 is arranged within the power flow between the fifth shaft 346 and the sixth shaft 348.

Moreover, the fifth torque-transmitting mechanism 366 is arranged within the power flow between the fourth shaft 336 and the fifth shaft 346.

The kinematic couplings of the embodiment in FIG. 3 can further be described with respect to the selective engagement of the torque-transmitting mechanisms with respect to one or more components of the plurality of planetary gearsets. For example, in the transmission 300, the first torque-transmitting mechanism 358 is selectively engageable to couple the first sun gear 314, the second sun gear 328, and the first shaft 322 to the housing G of the transmission 300. The second torque-transmitting mechanism 360 is selectively engageable to couple the first carrier member 318 and the second shaft 324 to the housing G of the transmission 300. Moreover, the third torque-transmitting mechanism 362 is selectively engageable to couple input shaft 302 and the second carrier member 332 to the fifth shaft 346 and fourth sun gear 350. The fourth torque-transmitting mechanism 364 is selectively engageable to couple fifth shaft 346 and fourth sun gear 350 to the third sun gear 338 and the sixth shaft 348. Lastly, the fifth torque-transmitting mechanism 366 is selectively engageable to couple the second ring gear 330, the third ring gear 340 and the fourth shaft 336 to the fifth shaft 346 and fourth sun gear 350.

Figure 4:
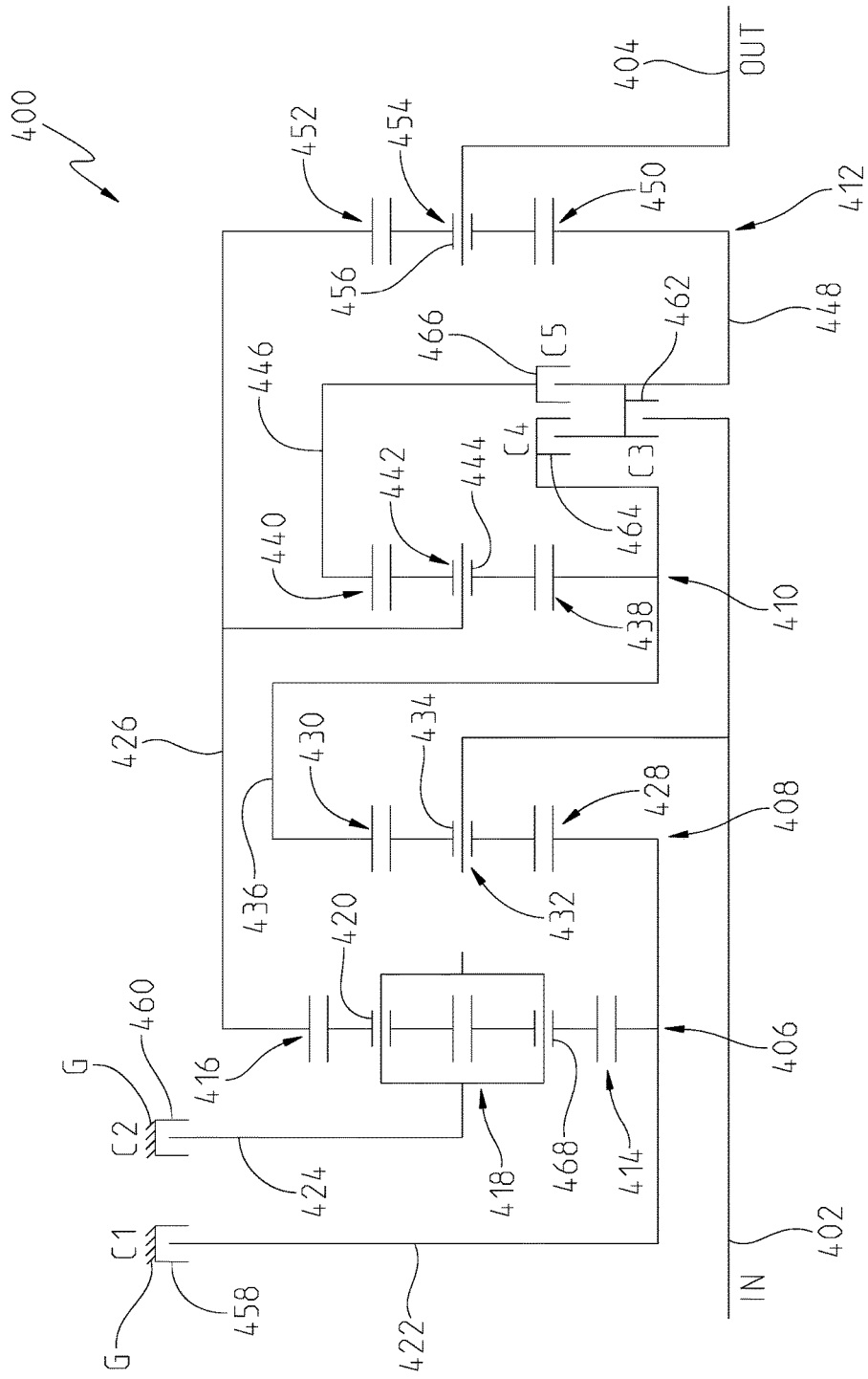
FIG. 4 is a diagrammatic view of a third embodiment of a multiple speed transmission.

Referring to FIG. 4, a schematic representation or stick diagram illustrates one embodiment of a multi-speed transmission 400 according to the present disclosure. The transmission 400 includes an input shaft 402 and an output shaft 404. The input shaft 402 and output shaft 404 can be disposed along the same axis or centerline of the transmission 400. In another aspect, the different shafts can be disposed along different axes or centerlines. In a further aspect, the different shafts can be disposed parallel to one another, but along different axes or centerlines. Other aspect can be appreciated by one skilled in the art.

The transmission 400 can also include a plurality of planetary gearsets. In the illustrated embodiment of FIG. 4, the transmission 400 includes a first planetary gearset 406, a second planetary gearset 408, a third planetary gearset 410, and a fourth planetary gearset 412. Each planetary gearset can be referred to as a simple or compound planetary gearset. For example, in some aspects, one or more of the plurality of planetary gearsets can be formed as an idler planetary gearset. In FIG. 4, for instance, the first planetary gearset 406 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 400, but for sake of simplicity and in this particular example only, the planetary gearsets are aligned in an axial direction consecutively in sequence (i.e., first, second, third, and fourth between the input and output shafts).

The transmission 400 may also include a plurality of torque-transmitting or gearshifting mechanisms. For example, one or more of these mechanisms can include a clutch or brake. In one aspect, each of the plurality of mechanisms is disposed within an outer housing of the transmission 400. In another aspect, however, one or more of the mechanisms may be disposed outside of the housing. Each of the plurality of mechanisms can be coupled to one or more of the plurality of planetary gearsets, which will be described further below.

In the embodiment of FIG. 4, the transmission 400 can include a first torque-transmitting mechanism 458 and a second torque-transmitting mechanism 460 that are configured to function as brakes (e.g., the torque-transmitting mechanism is fixedly coupled to the outer housing of the transmission 400). Each brake can be configured as a shiftable-friction-locked disk brake, shiftable friction-locked band brake, shiftable form-locking claw or conical brake, or any other type of known brake. The transmission 400 can include a third torque-transmitting mechanism 462, a fourth torque-transmitting mechanism 464, and a fifth torque-transmitting mechanism 466 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 400 of FIG. 4 may also include up to eight different shafts, which is inclusive of the input shaft 402 and output shaft 404. Each of these shafts, designated as a first shaft 422, a second shaft 424, a third shaft 426, a fourth shaft 436, a fifth shaft 446, and a sixth shaft 448, are configured to be connected to one or more of the plurality of planetary gearsets or plurality of torque-transmitting mechanism between the input shaft 402 and output shaft 404.

In FIG. 4, the first planetary gearset 406, i.e., the idler planetary gearset, can include a first sun gear 414, a first ring gear 416, and a first carrier member 418 that rotatably supports two sets of pinion gears 420. One set of pinion gears 468 is rotationally coupled to the sun gear 414 and the other set of pinion gears 420 is rotationally coupled to the ring gear 416. The second planetary gearset 408 can include a second sun gear 428, a second ring gear 430, and a second carrier member 432 that rotatably supports a set of pinion gears 434. The third planetary gearset 410 can include a third sun gear 438, a third ring gear 440, and a third carrier member 442 that rotatably supports a set of pinion gears 444. The fourth planetary gearset 412 can include a fourth sun gear 450, a fourth ring gear 452, and a fourth carrier member 454 that rotatably supports a set of pinion gears 456.

The transmission 400 is capable of transferring torque from the input shaft 402 to the output shaft 404 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 458, 460, 462, 464, and 466). Those skilled in the art will readily understand that a different speed ratio is associated with each torque ratio. Thus, at least eight forward speed ratios and at least one reverse speed ratio may be attained by transmission 400.

As for the transmission 400, kinematic coupling of the first planetary gearset 406 is shown in FIG. 4. The first sun gear 414 is coupled to the first shaft 422 for common rotation therewith. The first carrier member 418 is coupled to the second shaft 424 for common rotation therewith. First ring gear 416 is coupled for common rotation with the third shaft 426.

With respect to the second planetary gearset 408, the second sun gear 428 is coupled to the first shaft 422 and first sun gear 414 for common rotation therewith. The second ring gear 430 is coupled to the fourth shaft 436 for common rotation therewith. The second carrier member 432 is coupled for common rotation with the input shaft 402.

The third sun gear 438 of the third planetary gearset 410 is coupled to the fourth shaft 436 for common rotation therewith. The third ring gear 440 is coupled to the fifth shaft 446 for common rotation therewith. Third pinion gears 444 are configured to intermesh with the third sun gear 438 and third ring gear 440, respectively. The third carrier member 442 is coupled for common rotation with the third shaft 426, the first ring gear 416 and fourth ring gear 452.

The kinematic relationship of the fourth planetary gearset 412 is such that the fourth sun gear 450 is coupled to the sixth shaft 448 for common rotation therewith. The fourth ring gear 452 is coupled to the third shaft 426 for common rotation therewith. The fourth pinion gears 456 are configured to intermesh with the fourth sun gear 450 and the fourth ring gear 452. The fourth carrier member 454 is coupled to the output shaft 404 for common rotation therewith.

With regards to the kinematic coupling of the five torque-transmitting mechanisms to the previously described shafts, the multiple speed transmission 400 of FIG. 4 provides that the first torque-transmitting mechanism 458 is arranged within the power flow between the first shaft 422 and a housing G of the transmission 400. In this manner, the first torque-transmitting mechanism 458 is configured to act as a brake. The second torque-transmitting mechanism 460 is arranged within the power flow between the second shaft 424 and the housing G of the transmission 400. In this manner, the second torque-transmitting mechanism 460 is configured to act as a brake. In this embodiment of the transmission 400 therefore two of the five torque-transmitting mechanisms are configured to act as a brake and the other three torque-transmitting mechanisms are configured to act as clutches.

The third torque-transmitting mechanism 462, for example, is arranged within the power flow between the input shaft 402 and the sixth shaft 448. The fourth torque-transmitting mechanism 464 is arranged within the power flow between the fourth shaft 436 and the sixth shaft 448. Moreover, the fifth torque-transmitting mechanism 466 is arranged within the power flow between the fifth shaft 446 and the sixth shaft 448.

The kinematic couplings of the embodiment in FIG. 4 can further be described with respect to the selective engagement of the torque-transmitting mechanisms with respect to one or more components of the plurality of planetary gearsets. For example, in the transmission 400, the first torque-transmitting mechanism 458 is selectively engageable to couple the first sun gear 414, the second sun gear 428, and the first shaft 422 to the housing G of the transmission 400. The second torque-transmitting mechanism 460 is selectively engageable to couple the first carrier member 418 and the second shaft 424 to the housing G of the transmission 400. Moreover, the third torque-transmitting mechanism 462 is selectively engageable to couple input shaft 402 and the second carrier member 432 to the sixth shaft 448 and fourth sun gear 450. The fourth torque-transmitting mechanism 464 is selectively engageable to couple fourth shaft 436, the second ring gear 430, and third sun gear 438 to the fourth sun gear 450 and the sixth shaft 448. Lastly, the fifth torque-transmitting mechanism 466 is selectively engageable to couple the third ring gear 440 and the fifth shaft 446 to the sixth shaft 448 and fourth sun gear 450.

Figure 5:
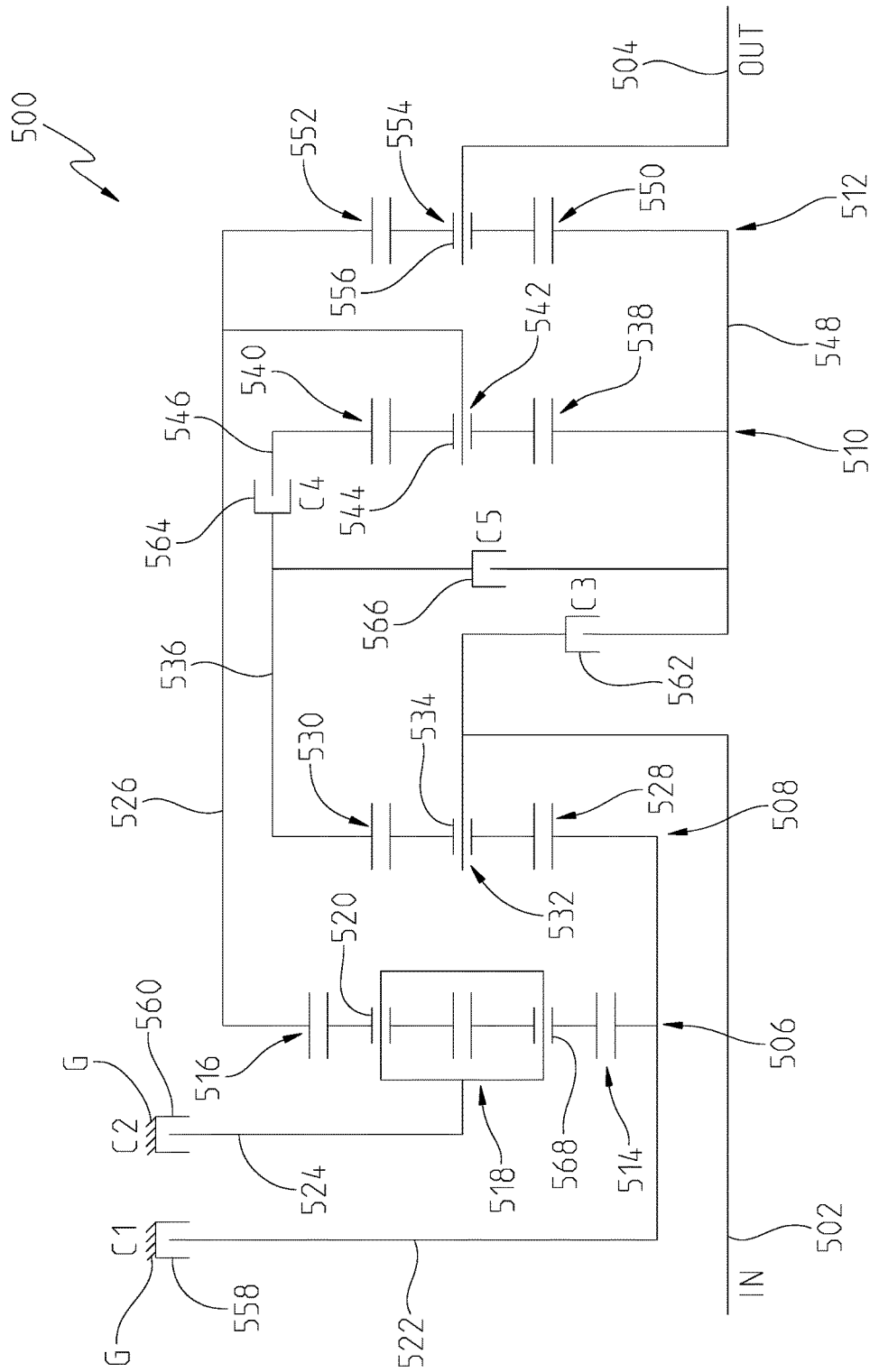
FIG. 5 is a diagrammatic view of a fourth embodiment of a multiple speed transmission.

Referring to FIG. 5, a schematic representation or stick diagram illustrates one embodiment of a multi-speed transmission 500 according to the present disclosure. The transmission 500 includes an input shaft 502 and an output shaft 504. The input shaft 502 and output shaft 504 can be disposed along the same axis or centerline of the transmission 500. In another aspect, the different shafts can be disposed along different axes or centerlines. In a further aspect, the different shafts can be disposed parallel to one another, but along different axes or centerlines. Other aspect can be appreciated by one skilled in the art.

The transmission 500 can also include a plurality of planetary gearsets. In the illustrated embodiment of FIG. 5, the transmission 500 includes a first planetary gearset 506, a second planetary gearset 508, a third planetary gearset 510, and a fourth planetary gearset 512. Each planetary gearset can be referred to as a simple or compound planetary gearset. For example, in some aspects, one or more of the plurality of planetary gearsets can be formed as an idler planetary gearset. In FIG. 5, for instance, the first planetary gearset 506 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 500, but for sake of simplicity and in this particular example only, the planetary gearsets are aligned in an axial direction consecutively in sequence (i.e., first, second, third, and fourth between the input and output shafts).

The transmission 500 may also include a plurality of torque-transmitting or gearshifting mechanisms. For example, one or more of these mechanisms can include a clutch or brake. In one aspect, each of the plurality of mechanisms is disposed within an outer housing of the transmission 500. In another aspect, however, one or more of the mechanisms may be disposed outside of the housing. Each of the plurality of mechanisms can be coupled to one or more of the plurality of planetary gearsets, which will be described further below.

In the embodiment of FIG. 5, the transmission 500 can include a first torque-transmitting mechanism 558 and a second torque-transmitting mechanism 560 that are configured to function as brakes (e.g., the torque-transmitting mechanism is fixedly coupled to the outer housing of the transmission 500). Each brake can be configured as a shiftable-friction-locked disk brake, shiftable friction-locked band brake, shiftable form-locking claw or conical brake, or any other type of known brake. The transmission 500 can include a third torque-transmitting mechanism 562, a fourth torque-transmitting mechanism 564, and a fifth torque-transmitting mechanism 566 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 500 of FIG. 5 may also include up to eight different shafts, which is inclusive of the input shaft 502 and output shaft 504. Each of these shafts, designated as a first shaft 522, a second shaft 524, a third shaft 526, a fourth shaft 536, a fifth shaft 546, and a sixth shaft 548, are configured to be connected to one or more of the plurality of planetary gearsets or plurality of torque-transmitting mechanism between the input shaft 502 and output shaft 504.

In FIG. 5, the first planetary gearset 506, i.e., the idler planetary gearset, can include a first sun gear 514, a first ring gear 516, and a first carrier member 518 that rotatably supports two sets of pinion gears 520. One set of pinion gears 568 is rotationally coupled to the sun gear 514 and the other set of pinion gears 520 is rotationally coupled to the ring gear 516. The second planetary gearset 508 can include a second sun gear 528, a second ring gear 530, and a second carrier member 532 that rotatably supports a set of pinion gears 534. The third planetary gearset 510 can include a third sun gear 538, a third ring gear 540, and a third carrier member 542 that rotatably supports a set of pinion gears 544. The fourth planetary gearset 512 can include a fourth sun gear 550, a fourth ring gear 552, and a fourth carrier member 554 that rotatably supports a set of pinion gears 556.

The transmission 500 is capable of transferring torque from the input shaft 502 to the output shaft 504 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 558, 560, 562, 564, and 566). Those skilled in the art will readily understand that a different speed ratio is associated with each torque ratio. Thus, at least eight forward speed ratios and at least one reverse speed ratio may be attained by transmission 500.

As for the transmission 500, kinematic coupling of the first planetary gearset 506 is shown in FIG. 5. The first sun gear 514 is coupled to the first shaft 522 for common rotation therewith. The first carrier member 518 is coupled to the second shaft 524 for common rotation therewith. First ring gear 516 is coupled for common rotation with the third shaft 526.

With respect to the second planetary gearset 508, the second sun gear 528 is coupled to the first shaft 522 and first sun gear 514 for common rotation therewith. The second ring gear 530 is coupled to the fourth shaft 536 for common rotation therewith. The second carrier member 532 is coupled for common rotation with the input shaft 502.

The third sun gear 538 of the third planetary gearset 510 is coupled to the sixth shaft 548 for common rotation therewith. The third ring gear 540 is coupled to the fifth shaft 546 for common rotation therewith. Third pinion gears 544 are configured to intermesh with the third sun gear 538 and third ring gear 540, respectively. The third carrier member 542 is coupled for common rotation with the third shaft 526, the first ring gear 516 and fourth ring gear 552.

The kinematic relationship of the fourth planetary gearset 512 is such that the fourth sun gear 550 is coupled to the sixth shaft 548 for common rotation therewith. The fourth ring gear 552 is coupled to the third shaft 526 for common rotation therewith. The fourth pinion gears 556 are configured to intermesh with the fourth sun gear 550 and the fourth ring gear 552. The fourth carrier member 554 is coupled to the output shaft 504 for common rotation therewith.

With regards to the kinematic coupling of the five torque-transmitting mechanisms to the previously described shafts, the multiple speed transmission 500 of FIG. 5 provides that the first torque-transmitting mechanism 558 is arranged within the power flow between the first shaft 522 and a housing G of the transmission 500. In this manner, the first torque-transmitting mechanism 558 is configured to act as a brake. The second torque-transmitting mechanism 560 is arranged within the power flow between the second shaft 524 and the housing G of the transmission 500. In this manner, the second torque-transmitting mechanism 560 is configured to act as a brake. In this embodiment of the transmission 500 therefore two of the five torque-transmitting mechanisms are configured to act as a brake and the other three torque-transmitting mechanisms are configured to act as clutches.

The third torque-transmitting mechanism 562, for example, is arranged within the power flow between the input shaft 502 and the sixth shaft 548. The fourth torque-transmitting mechanism 564 is arranged within the power flow between the fourth shaft 536 and the fifth shaft 546. Moreover, the fifth torque-transmitting mechanism 566 is arranged within the power flow between the fourth shaft 536 and the sixth shaft 548.

The kinematic couplings of the embodiment in FIG. 5 can further be described with respect to the selective engagement of the torque-transmitting mechanisms with respect to one or more components of the plurality of planetary gearsets. For example, in the transmission 500, the first torque-transmitting mechanism 558 is selectively engageable to couple the first sun gear 514, the second sun gear 528, and the first shaft 522 to the housing G of the transmission 500. The second torque-transmitting mechanism 560 is selectively engageable to couple the first carrier member 518 and the third shaft 524 to the housing G of the transmission 500. Moreover, the third torque-transmitting mechanism 562 is selectively engageable to couple input shaft 502 and the second carrier member 532 to the sixth shaft 548, the third sun gear 538, and fourth sun gear 550. The fourth torque-transmitting mechanism 564 is selectively engageable to couple fourth shaft 536 and the second ring gear 530 to the third ring gear 540 and the fifth shaft 546. Lastly, the fifth torque-transmitting mechanism 566 is selectively engageable to couple the second ring gear 530 and the fourth shaft 536 to the sixth shaft 548, the third sun gear 538, and fourth sun gear 550.

Figure 6:
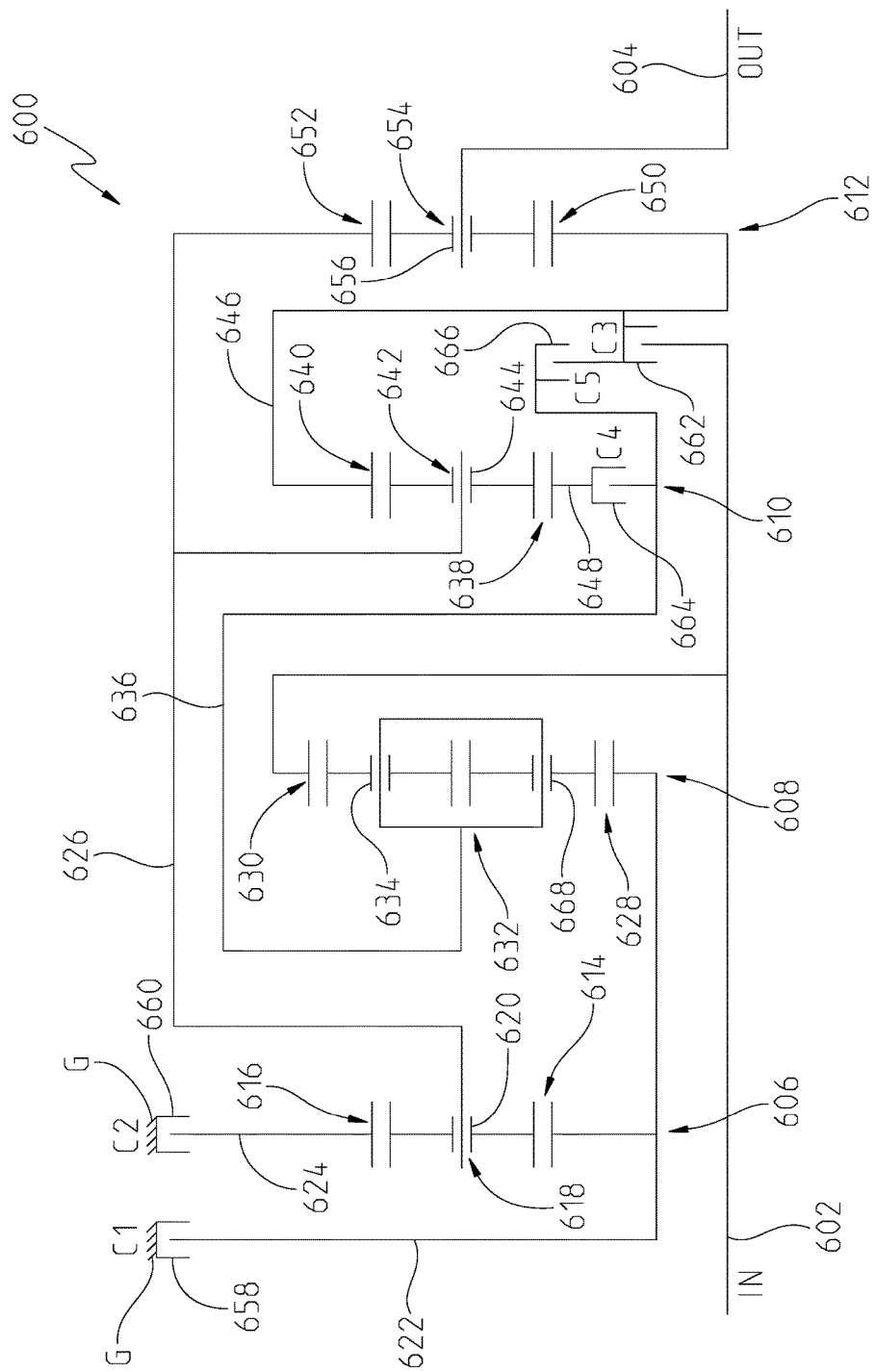
FIG. 6 is a diagrammatic view of a fifth embodiment of a multiple speed transmission.

Referring to FIG. 6, a schematic representation or stick diagram illustrates one embodiment of a multi-speed transmission 600 according to the present disclosure. The transmission 600 includes an input shaft 602 and an output shaft 604. The input shaft 602 and output shaft 604 can be disposed along the same axis or centerline of the transmission 600. In another aspect, the different shafts can be disposed along different axes or centerlines. In a further aspect, the different shafts can be disposed parallel to one another, but along different axes or centerlines. Other aspect can be appreciated by one skilled in the art.

The transmission 600 can also include a plurality of planetary gearsets. In the illustrated embodiment of FIG. 6, the transmission 600 includes a first planetary gearset 606, a second planetary gearset 608, a third planetary gearset 610, and a fourth planetary gearset 612. Each planetary gearset can be referred to as a simple or compound planetary gearset. For example, in some aspects, one or more of the plurality of planetary gearsets can be formed as an idler planetary gearset. In FIG. 6, for instance, the second planetary gearset 608 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 600, but for sake of simplicity and in this particular example only, the planetary gearsets are aligned in an axial direction consecutively in sequence (i.e., first, second, third, and fourth between the input and output shafts).

The transmission 600 may also include a plurality of torque-transmitting or gearshifting mechanisms. For example, one or more of these mechanisms can include a clutch or brake. In one aspect, each of the plurality of mechanisms is disposed within an outer housing of the transmission 600. In another aspect, however, one or more of the mechanisms may be disposed outside of the housing. Each of the plurality of mechanisms can be coupled to one or more of the plurality of planetary gearsets, which will be described further below.

In the embodiment of FIG. 6, the transmission 600 can include a first torque-transmitting mechanism 658 and a second torque-transmitting mechanism 660 that are configured to function as brakes (e.g., the torque-transmitting mechanism is fixedly coupled to the outer housing of the transmission 600). Each brake can be configured as a shiftable-friction-locked disk brake, shiftable friction-locked band brake, shiftable form-locking claw or conical brake, or any other type of known brake. The transmission 600 can include a third torque-transmitting mechanism 662, a fourth torque-transmitting mechanism 664, and a fifth torque-transmitting mechanism 666 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 600 of FIG. 6 may also include up to eight different shafts, which is inclusive of the input shaft 602 and output shaft 604. Each of these shafts, designated as a first shaft 622, a second shaft 624, a third shaft 626, a fourth shaft 636, a fifth shaft 646, and a sixth shaft 648, are configured to be connected to one or more of the plurality of planetary gearsets or plurality of torque-transmitting mechanism between the input shaft 602 and output shaft 604.

In FIG. 6, the first planetary gearset 606 can include a first sun gear 614, a first ring gear 616, and a first carrier member 618 that rotatably supports a set of pinion gears 620. The second planetary gearset 608, i.e., the idler planetary gearset, can include a second sun gear 628, a second ring gear 630, and a second carrier member 632 that rotatably supports two sets of pinion gears. One set of pinion gears 668 is rotationally coupled to the sun gear 628 and the other set of pinion gears 634 is rotationally coupled to the ring gear 630. The third planetary gearset 610 can include a third sun gear 638, a third ring gear 640, and a third carrier member 642 that rotatably supports a set of pinion gears 644. The fourth planetary gearset 612 can include a fourth sun gear 650, a fourth ring gear 652, and a fourth carrier member 654 that rotatably supports a set of pinion gears 656.

The transmission 600 is capable of transferring torque from the input shaft 602 to the output shaft 604 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 658, 660,662, 664, and 666). Those skilled in the art will readily understand that a different speed ratio is associated with each torque ratio. Thus, at least eight forward speed ratios and at least one reverse speed ratio may be attained by transmission 600.

As for the transmission 600, kinematic coupling of the first planetary gearset 606 is shown in FIG. 6. The first sun gear 614 is coupled to the first shaft 622 for common rotation therewith. The first carrier member 618 is coupled to the third shaft 626 for common rotation therewith. First ring gear 616 is coupled for common rotation with the second shaft 624.

With respect to the second planetary gearset 608, the second sun gear 628 is coupled to the first shaft 622 and first sun gear 614 for common rotation therewith. The second ring gear 630 is coupled to the input shaft 602 for common rotation therewith. The second carrier member 632 is coupled for common rotation with the fourth shaft 636.

The third sun gear 638 of the third planetary gearset 610 is coupled to the sixth shaft 648 for common rotation therewith. The third ring gear 640 is coupled to the fifth shaft 646 for common rotation therewith. Third pinion gears 644 are configured to intermesh with the third sun gear 638 and third ring gear 640, respectively. The third carrier member 642 is coupled for common rotation with the third shaft 626, the first carrier member 618 and fourth ring gear 652.

The kinematic relationship of the fourth planetary gearset 612 is such that the fourth sun gear 650 is coupled to the fifth shaft 646 for common rotation therewith. The fourth ring gear 652 is coupled to the third shaft 626 for common rotation therewith. The fourth pinion gears 656 are configured to intermesh with the fourth sun gear 650 and the fourth ring gear 652. The fourth carrier member 654 is coupled to the output shaft 604 for common rotation therewith.

With regards to the kinematic coupling of the five torque-transmitting mechanisms to the previously described shafts, the multiple speed transmission 600 of FIG. 6 provides that the first torque-transmitting mechanism 658 is arranged within the power flow between the first shaft 622 and a housing G of the transmission 600. In this manner, the first torque-transmitting mechanism 658 is configured to act as a brake. The second torque-transmitting mechanism 660 is arranged within the power flow between the second shaft 624 and the housing G of the transmission 600. In this manner, the second torque-transmitting mechanism 660 is configured to act as a brake. In this embodiment of the transmission 600 therefore two of the five torque-transmitting mechanisms are configured to act as a brake and the other three torque-transmitting mechanisms are configured to act as clutches.

The third torque-transmitting mechanism 662, for example, is arranged within the power flow between the input shaft 602 and the fifth shaft 646. The fourth torque-transmitting mechanism 664 is arranged within the power flow between the fourth shaft 636 and the sixth shaft 648. Moreover, the fifth torque-transmitting mechanism 666 is arranged within the power flow between the fourth shaft 636 and the fifth shaft 646.

The kinematic couplings of the embodiment in FIG. 6 can further be described with respect to the selective engagement of the torque-transmitting mechanisms with respect to one or more components of the plurality of planetary gearsets. For example, in the transmission 600, the first torque-transmitting mechanism 658 is selectively engageable to couple the first sun gear 614, the second sun gear 628, and the first shaft 622 to the housing G of the transmission 600. The second torque-transmitting mechanism 660 is selectively engageable to couple the first ring gear 616 and the second shaft 624 to the housing G of the transmission 600. Moreover, the third torque-transmitting mechanism 662 is selectively engageable to couple input shaft 602 and the second ring gear 630 to the fifth shaft 646, the third ring gear 640, and fourth sun gear 650. The fourth torque-transmitting mechanism 664 is selectively engageable to couple fourth shaft 636 and the second carrier member 632 to the third sun gear 638 and the sixth shaft 648. Lastly, the fifth torque-transmitting mechanism 666 is selectively engageable to couple the second carrier member 632 and the fourth shaft 636 to the fifth shaft 646, the third ring gear 640, and fourth sun gear 650.

Figure 7:
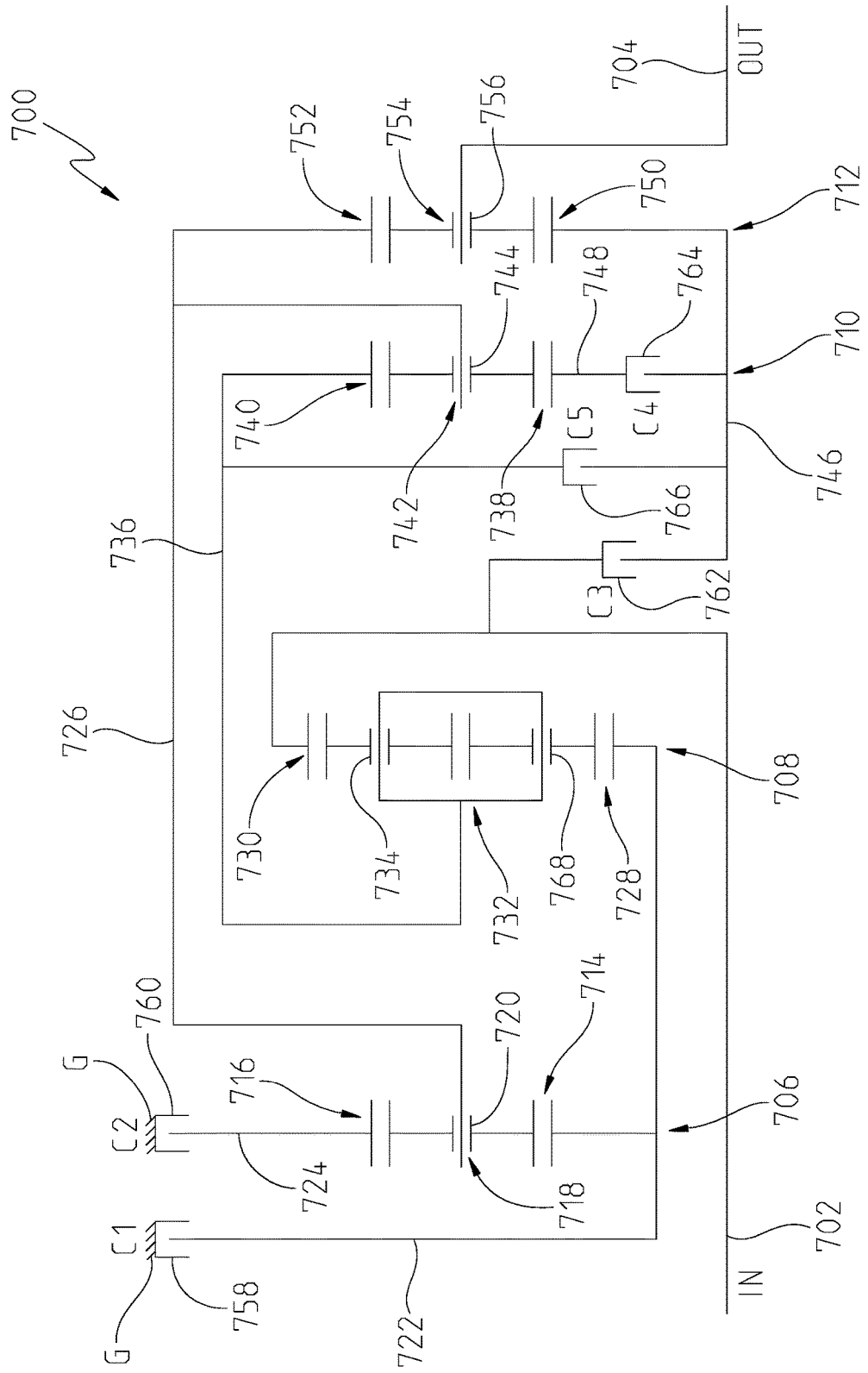
FIG. 7 is a diagrammatic view of a sixth embodiment of a multiple speed transmission.

Referring to FIG. 7, a schematic representation or stick diagram illustrates one embodiment of a multi-speed transmission 700 according to the present disclosure. The transmission 700 includes an input shaft 702 and an output shaft 704. The input shaft 702 and output shaft 704 can be disposed along the same axis or centerline of the transmission 700. In another aspect, the different shafts can be disposed along different axes or centerlines. In a further aspect, the different shafts can be disposed parallel to one another, but along different axes or centerlines. Other aspect can be appreciated by one skilled in the art.

The transmission 700 can also include a plurality of planetary gearsets. In the illustrated embodiment of FIG. 7, the transmission 700 includes a first planetary gearset 706, a second planetary gearset 708, a third planetary gearset 710, and a fourth planetary gearset 712. Each planetary gearset can be referred to as a simple or compound planetary gearset. For example, in some aspects, one or more of the plurality of planetary gearsets can be formed as an idler planetary gearset. In FIG. 7, for instance, the second planetary gearset 708 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 700, but for sake of simplicity and in this particular example only, the planetary gearsets are aligned in an axial direction consecutively in sequence (i.e., first, second, third, and fourth between the input and output shafts).

The transmission 700 may also include a plurality of torque-transmitting or gearshifting mechanisms. For example, one or more of these mechanisms can include a clutch or brake. In one aspect, each of the plurality of mechanisms is disposed within an outer housing of the transmission 700. In another aspect, however, one or more of the mechanisms may be disposed outside of the housing. Each of the plurality of mechanisms can be coupled to one or more of the plurality of planetary gearsets, which will be described further below.

In the embodiment of FIG. 7, the transmission 700 can include a first torque-transmitting mechanism 758 and a second torque-transmitting mechanism 760 that are configured to function as brakes (e.g., the torque-transmitting mechanism is fixedly coupled to the outer housing of the transmission 700). Each brake can be configured as a shiftable-friction-locked disk brake, shiftable friction-locked band brake, shiftable form-locking claw or conical brake, or any other type of known brake. The transmission 700 can include a third torque-transmitting mechanism 762, a fourth torque-transmitting mechanism 764, and a fifth torque-transmitting mechanism 766 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 700 of FIG. 7 may also include up to eight different shafts, which is inclusive of the input shaft 702 and output shaft 704. Each of these shafts, designated as a first shaft 722, a second shaft 724, a third shaft 726, a fourth shaft 736, a fifth shaft 746, and a sixth shaft 748, are configured to be connected to one or more of the plurality of planetary gearsets or plurality of torque-transmitting mechanism between the input shaft 702 and output shaft 704.

In FIG. 7, the first planetary gearset 706 can include a first sun gear 714, a first ring gear 716, and a first carrier member 718 that rotatably supports a set of pinion gears 720. The second planetary gearset 708, i.e., the idler planetary gearset, can include a second sun gear 728, a second ring gear 730, and a second carrier member 732 that rotatably supports two sets of pinion gears. One set of pinion gears 768 is rotationally coupled to the sun gear 728 and the other set of pinion gears 734 is rotationally coupled to the ring gear 730. The third planetary gearset 710 can include a third sun gear 738, a third ring gear 740, and a third carrier member 742 that rotatably supports a set of pinion gears 744. The fourth planetary gearset 712 can include a fourth sun gear 750, a fourth ring gear 752, and a fourth carrier member 754 that rotatably supports a set of pinion gears 756.

The transmission 700 is capable of transferring torque from the input shaft 702 to the output shaft 704 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 758, 760, 762, 764, and 766). Those skilled in the art will readily understand that a different speed ratio is associated with each torque ratio. Thus, at least eight forward speed ratios and at least one reverse speed ratio may be attained by transmission 700.

As for the transmission 700, kinematic coupling of the first planetary gearset 706 is shown in FIG. 7. The first sun gear 714 is coupled to the first shaft 722 for common rotation therewith. The first carrier member 718 is coupled to the third shaft 726 for common rotation therewith. First ring gear 716 is coupled for common rotation with the second shaft 724.

With respect to the second planetary gearset 708, the second sun gear 728 is coupled to the first shaft 722 and first sun gear 714 for common rotation therewith. The second ring gear 730 is coupled to the input shaft 702 for common rotation therewith. The second carrier member 732 is coupled for common rotation with the fourth shaft 736.

The third sun gear 738 of the third planetary gearset 710 is coupled to the sixth shaft 748 for common rotation therewith. The third ring gear 740 is coupled to the fourth shaft 736 for common rotation therewith. Third pinion gears 744 are configured to intermesh with the third sun gear 738 and third ring gear 740, respectively. The third carrier member 742 is coupled for common rotation with the third shaft 726, the first carrier member 718 and fourth ring gear 752.

The kinematic relationship of the fourth planetary gearset 712 is such that the fourth sun gear 750 is coupled to the fifth shaft 746 for common rotation therewith. The fourth ring gear 752 is coupled to the third shaft 726 for common rotation therewith. The fourth pinion gears 756 are configured to intermesh with the fourth sun gears 750 and the fourth ring gear 752. The fourth carrier member 754 is coupled to the output shaft 704 for common rotation therewith.

With regards to the kinematic coupling of the five torque-transmitting mechanisms to the previously described shafts, the multiple speed transmission 700 of FIG. 7 provides that the first torque-transmitting mechanism 758 is arranged within the power flow between the first shaft 722 and a housing G of the transmission 700. In this manner, the first torque-transmitting mechanism 758 is configured to act as a brake. The second torque-transmitting mechanism 760 is arranged within the power flow between the second shaft 724 and the housing G of the transmission 700. In this manner, the second torque-transmitting mechanism 760 is configured to act as a brake. In this embodiment of the transmission 700 therefore two of the five torque-transmitting mechanisms are configured to act as a brake and the other three torque-transmitting mechanisms are configured to act as clutches.

The third torque-transmitting mechanism 762, for example, is arranged within the power flow between the input shaft 702 and the fifth shaft 746. The fourth torque-transmitting mechanism 764 is arranged within the power flow between the fifth shaft 746 and the sixth shaft 748. Moreover, the fifth torque-transmitting mechanism 766 is arranged within the power flow between the fourth shaft 736 and the fifth shaft 746.

The kinematic couplings of the embodiment in FIG. 7 can further be described with respect to the selective engagement of the torque-transmitting mechanisms with respect to one or more components of the plurality of planetary gearsets. For example, in the transmission 700, the first torque-transmitting mechanism 758 is selectively engageable to couple the first sun gear 714, the second sun gear 728, and the first shaft 722 to the housing G of the transmission 700. The second torque-transmitting mechanism 760 is selectively engageable to couple the first ring gear 716 and the second shaft 724 to the housing G of the transmission 700. Moreover, the third torque-transmitting mechanism 762 is selectively engageable to couple input shaft 702 and the second ring gear 730 to the fifth shaft 746 and fourth sun gear 750. The fourth torque-transmitting mechanism 764 is selectively engageable to couple the third sun gear 738 and the sixth shaft 748 to the fifth shaft 746 and fourth sun gear 750. Lastly, the fifth torque-transmitting mechanism 766 is selectively engageable to couple the second carrier member 732 and the fourth shaft 736 to the fifth shaft 746 and fourth sun gear 750.

Figure 8:
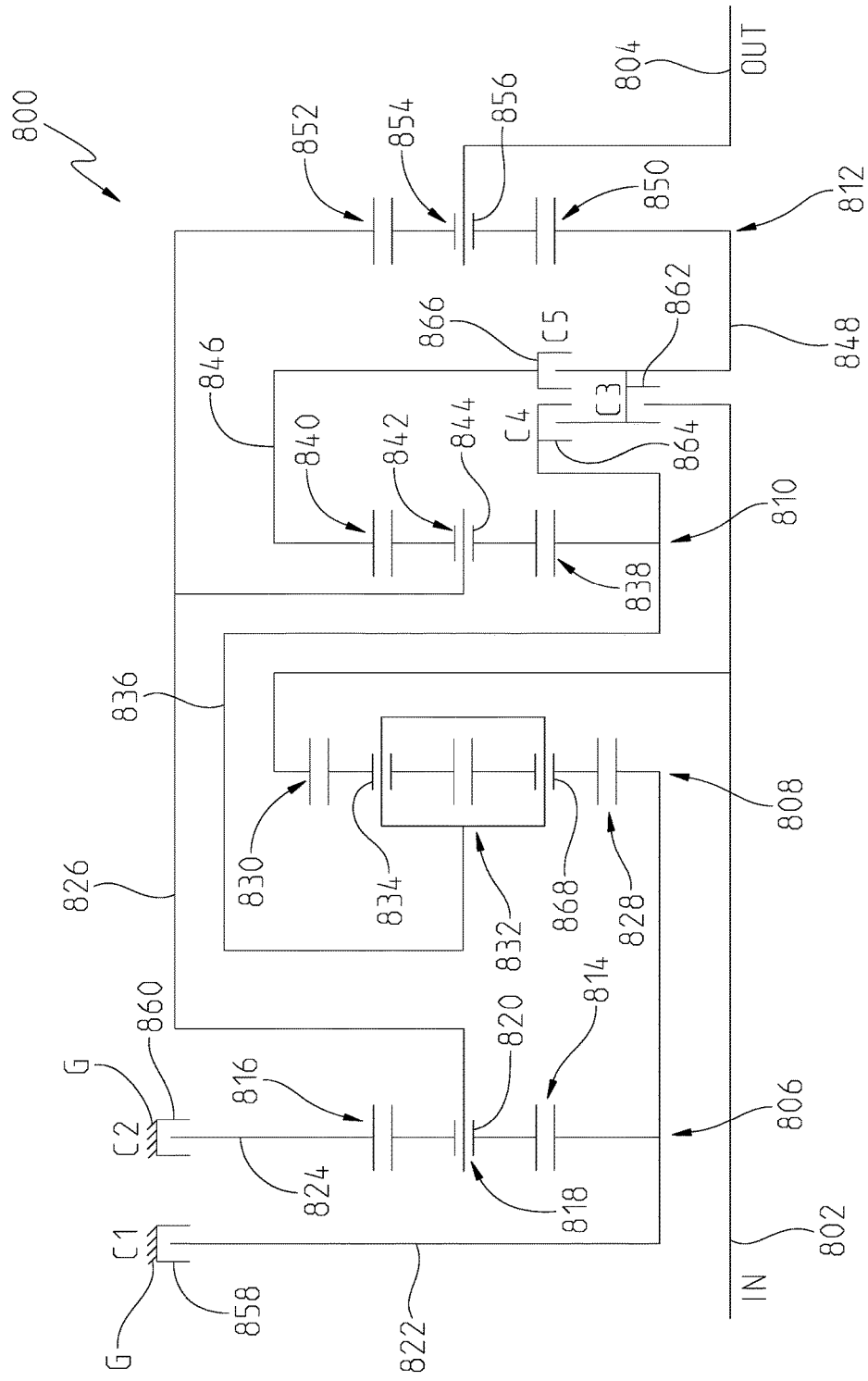
FIG. 8 is a diagrammatic view of a seventh embodiment of a multiple speed transmission.

Referring to FIG. 8, a schematic representation or stick diagram illustrates one embodiment of a multi-speed transmission 800 according to the present disclosure. The transmission 800 includes an input shaft 802 and an output shaft 804. The input shaft 802 and output shaft 804 can be disposed along the same axis or centerline of the transmission 800. In another aspect, the different shafts can be disposed along different axes or centerlines. In a further aspect, the different shafts can be disposed parallel to one another, but along different axes or centerlines. Other aspect can be appreciated by one skilled in the art.

The transmission 800 can also include a plurality of planetary gearsets. In the illustrated embodiment of FIG. 8, the transmission 800 includes a first planetary gearset 806, a second planetary gearset 808, a third planetary gearset 810, and a fourth planetary gearset 812. Each planetary gearset can be referred to as a simple or compound planetary gearset. For example, in some aspects, one or more of the plurality of planetary gearsets can be formed as an idler planetary gearset. In FIG. 8, for instance, the second planetary gearset 808 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 800, but for sake of simplicity and in this particular example only, the planetary gearsets are aligned in an axial direction consecutively in sequence (i.e., first, second, third, and fourth between the input and output shafts).

The transmission 800 may also include a plurality of torque-transmitting or gearshifting mechanisms. For example, one or more of these mechanisms can include a clutch or brake. In one aspect, each of the plurality of mechanisms is disposed within an outer housing of the transmission 800. In another aspect, however, one or more of the mechanisms may be disposed outside of the housing. Each of the plurality of mechanisms can be coupled to one or more of the plurality of planetary gearsets, which will be described further below.

In the embodiment of FIG. 8, the transmission 800 can include a first torque-transmitting mechanism 858 and a second torque-transmitting mechanism 860 that are configured to function as brakes (e.g., the torque-transmitting mechanism is fixedly coupled to the outer housing of the transmission 800). Each brake can be configured as a shiftable-friction-locked disk brake, shiftable friction-locked band brake, shiftable form-locking claw or conical brake, or any other type of known brake. The transmission 800 can include a third torque-transmitting mechanism 862, a fourth torque-transmitting mechanism 864, and a fifth torque-transmitting mechanism 866 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 800 of FIG. 8 may also include up to eight different shafts, which is inclusive of the input shaft 802 and output shaft 804. Each of these shafts, designated as a first shaft 822, a second shaft 824, a third shaft 826, a fourth shaft 836, a fifth shaft 846, and a sixth shaft 848, are configured to be connected to one or more of the plurality of planetary gearsets or plurality of torque-transmitting mechanism between the input shaft 802 and output shaft 804.

In FIG. 8, the first planetary gearset 806 can include a first sun gear 814, a first ring gear 816, and a first carrier member 818 that rotatably supports a set of pinion gears 820. The second planetary gearset 808, i.e., the idler planetary gearset, can include a second sun gear 828, a second ring gear 830, and a second carrier member 832 that rotatably supports two sets of pinion gears. One set of pinion gears 868 is rotationally coupled to the sun gear 828 and the other set of pinion gears 834 is rotationally coupled to the ring gear 830. The third planetary gearset 810 can include a third sun gear 838, a third ring gear 840, and a third carrier member 842 that rotatably supports a set of pinion gears 844. The fourth planetary gearset 812 can include a fourth sun gear 850, a fourth ring gear 852, and a fourth carrier member 854 that rotatably supports a set of pinion gears 856.

The transmission 800 is capable of transferring torque from the input shaft 802 to the output shaft 804 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 858, 860, 862, 864, and 866). Those skilled in the art will readily understand that a different speed ratio is associated with each torque ratio. Thus, at least eight forward speed ratios and at least one reverse speed ratio may be attained by transmission 800.

As for the transmission 800, kinematic coupling of the first planetary gearset 806 is shown in FIG. 8. The first sun gear 814 is coupled to the first shaft 822 for common rotation therewith. The first carrier member 818 is coupled to the third shaft 826 for common rotation therewith. First ring gear 816 is coupled for common rotation with the second shaft 824.

With respect to the second planetary gearset 808, the second sun gear 828 is coupled to the first shaft 822 and first sun gear 814 for common rotation therewith. The second ring gear 830 is coupled to the input shaft 802 for common rotation therewith. The second carrier member 832 is coupled for common rotation with the fourth shaft 836.

The third sun gear 838 of the third planetary gearset 810 is coupled to the fourth shaft 836 for common rotation therewith. The third ring gear 840 is coupled to the fifth shaft 846 for common rotation therewith. Third pinion gears 844 are configured to intermesh with the third sun gear 838 and third ring gear 840, respectively. The third carrier member 842 is coupled for common rotation with the third shaft 826, the first carrier member 818 and fourth ring gear 852.

The kinematic relationship of the fourth planetary gearset 812 is such that the fourth sun gear 850 is coupled to the sixth shaft 848 for common rotation therewith. The fourth ring gear 852 is coupled to the third shaft 826 for common rotation therewith. The fourth pinion gears 856 are configured to intermesh with the fourth sun gear 850 and the fourth ring gear 852. The fourth carrier member 854 is coupled to the output shaft 804 for common rotation therewith.

With regards to the kinematic coupling of the five torque-transmitting mechanisms to the previously described shafts, the multiple speed transmission 800 of FIG. 8 provides that the first torque-transmitting mechanism 858 is arranged within the power flow between the first shaft 822 and a housing G of the transmission 800. In this manner, the first torque-transmitting mechanism 858 is configured to act as a brake. The second torque-transmitting mechanism 860 is arranged within the power flow between the second shaft 824 and the housing G of the transmission 800. In this manner, the second torque-transmitting mechanism 860 is configured to act as a brake. In this embodiment of the transmission 800 therefore two of the five torque-transmitting mechanisms are configured to act as a brake and the other three torque-transmitting mechanisms are configured to act as clutches.

The third torque-transmitting mechanism 862, for example, is arranged within the power flow between the input shaft 802 and the sixth shaft 848. The fourth torque-transmitting mechanism 864 is arranged within the power flow between the fourth shaft 836 and the sixth shaft 848. Moreover, the fifth torque-transmitting mechanism 866 is arranged within the power flow between the fifth shaft 846 and the sixth shaft 848.

The kinematic couplings of the embodiment in FIG. 8 can further be described with respect to the selective engagement of the torque-transmitting mechanisms with respect to one or more components of the plurality of planetary gearsets. For example, in the transmission 800, the first torque-transmitting mechanism 858 is selectively engageable to couple the first sun gear 814, the second sun gear 828, and the first shaft 822 to the housing G of the transmission 800. The second torque-transmitting mechanism 860 is selectively engageable to couple the first ring gear 816 and the second shaft 824 to the housing G of the transmission 800. Moreover, the third torque-transmitting mechanism 862 is selectively engageable to couple input shaft 802 and the second ring gear 830 to the sixth shaft 848 and fourth sun gear 850. The fourth torque-transmitting mechanism 864 is selectively engageable to couple the second carrier member 832, the third sun gear 838 and the fourth shaft 836 to the sixth shaft 848 and fourth sun gear 850. Lastly, the fifth torque-transmitting mechanism 866 is selectively engageable to couple the third ring gear 840 and the fifth shaft 846 to the sixth shaft 848 and fourth sun gear 850.

Figure 9:
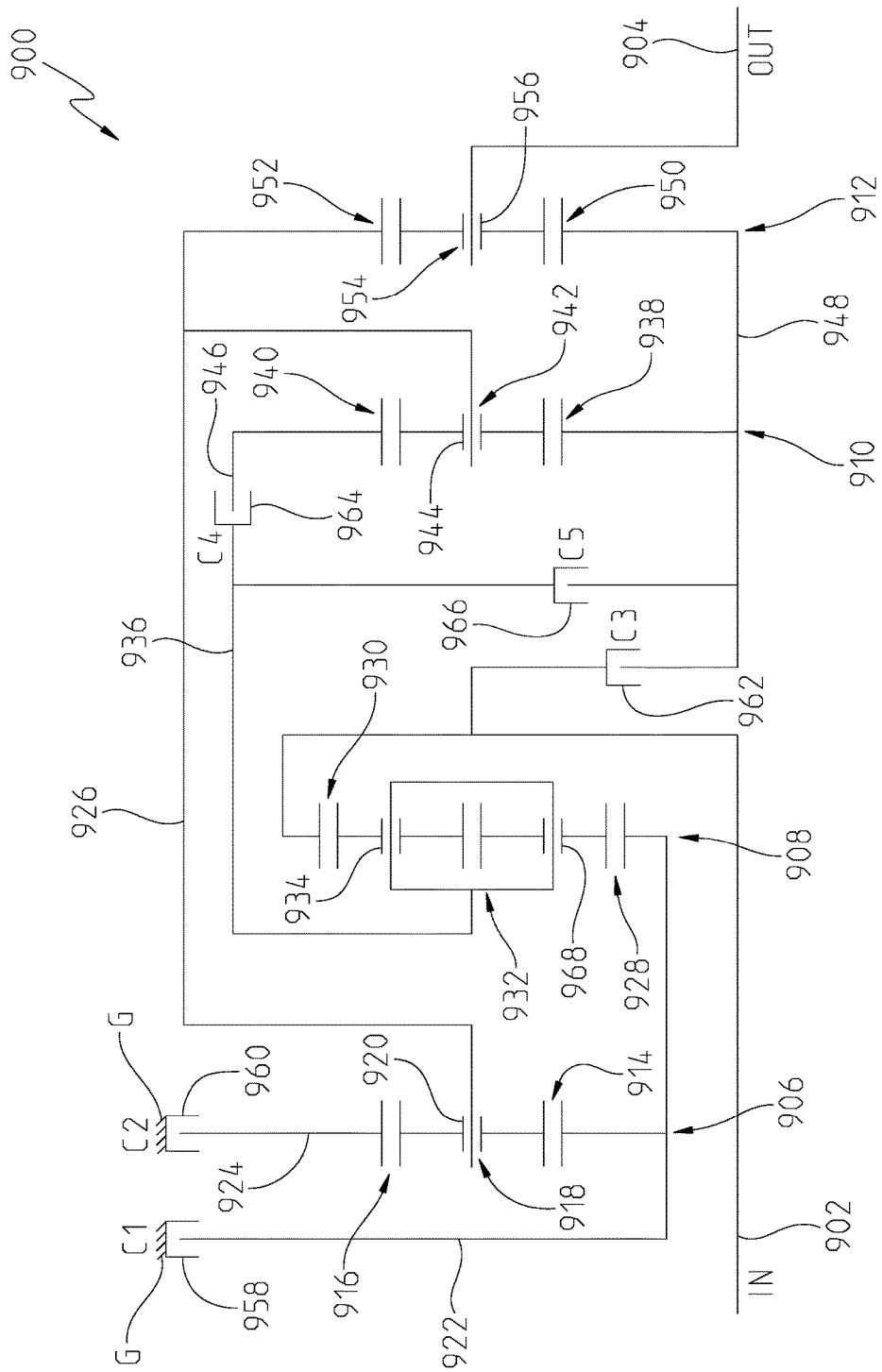
FIG. 9 is a diagrammatic view of an eighth embodiment of a multiple speed transmission.

Referring to FIG. 9, a schematic representation or stick diagram illustrates another embodiment of a multi-speed transmission 900 according to the present disclosure. The transmission 900 includes an input shaft 902 and an output shaft 904. The input shaft 902 and output shaft 904 can be disposed along the same axis or centerline of the transmission 900. In another aspect, the different shafts can be disposed along different axes or centerlines. In a further aspect, the different shafts can be disposed parallel to one another, but along different axes or centerlines. Other aspect can be appreciated by one skilled in the art.

The transmission 900 can also include a plurality of planetary gearsets. In the illustrated embodiment of FIG. 9, the transmission 900 includes a first planetary gearset 906, a second planetary gearset 908, a third planetary gearset 910, and a fourth planetary gearset 912. Each planetary gearset can be referred to as a simple or compound planetary gearset. For example, in some aspects, one or more of the plurality of planetary gearsets can be formed as an idler planetary gearset. In FIG. 9, for instance, the second planetary gearset 908 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 900, but for sake of simplicity and in this particular example only, the planetary gearsets are aligned in an axial direction consecutively in sequence (i.e., first, second, third, and fourth between the input and output shafts).

The transmission 900 may also include a plurality of torque-transmitting or gearshifting mechanisms. For example, one or more of these mechanisms can include a clutch or brake. In one aspect, each of the plurality of mechanisms is disposed within an outer housing of the transmission 900. In another aspect, however, one or more of the mechanisms may be disposed outside of the housing. Each of the plurality of mechanisms can be coupled to one or more of the plurality of planetary gearsets, which will be described further below.

In the embodiment of FIG. 9, the transmission 900 can include a first torque-transmitting mechanism 958 and a second torque-transmitting mechanism 960 that are configured to function as brakes (e.g., the torque-transmitting mechanism is fixedly coupled to the outer housing of the transmission 900). Each brake can be configured as a shiftable-friction-locked disk brake, shiftable friction-locked band brake, shiftable form-locking claw or conical brake, or any other type of known brake. The transmission 900 can include a third torque-transmitting mechanism 962, a fourth torque-transmitting mechanism 964, and a fifth torque-transmitting mechanism 966 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 900 of FIG. 9 may also include up to eight different shafts, which is inclusive of the input shaft 902 and output shaft 904. Each of these shafts, designated as a first shaft 922, a second shaft 924, a third shaft 926, a fourth shaft 936, a fifth shaft 946, and a sixth shaft 948, are configured to be connected to one or more of the plurality of planetary gearsets or plurality of torque-transmitting mechanism between the input shaft 902 and output shaft 904.

In FIG. 9, the first planetary gearset 906 can include a first sun gear 914, a first ring gear 916, and a first carrier member 918 that rotatably supports a set of pinion gears 920. The second planetary gearset 908, i.e., the idler planetary gearset, can include a second sun gear 928, a second ring gear 930, and a second carrier member 932 that rotatably supports two sets of pinion gears. One set of pinion gears 968 is rotationally coupled to the sun gear 928 and the other set of pinion gears 934 is rotationally coupled to the ring gear 930. The third planetary gearset 910 can include a third sun gear 938, a third ring gear 940, and a third carrier member 942 that rotatably supports a set of pinion gears 944. The fourth planetary gearset 912 can include a fourth sun gear 950, a fourth ring gear 952, and a fourth carrier member 954 that rotatably supports a set of pinion gears 956.

The transmission 900 is capable of transferring torque from the input shaft 902 to the output shaft 904 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 958, 960, 962, 964, and 966). Those skilled in the art will readily understand that a different speed ratio is associated with each torque ratio. Thus, at least eight forward speed ratios and at least one reverse speed ratio may be attained by transmission 900.

As for the transmission 900, kinematic coupling of the first planetary gearset 906 is shown in FIG. 9. The first sun gear 914 is coupled to the first shaft 922 for common rotation therewith. The first carrier member 918 is coupled to the third shaft 926 for common rotation therewith. First ring gear 916 is coupled for common rotation with the second shaft 924.

With respect to the second planetary gearset 908, the second sun gear 928 is coupled to the first shaft 922 and first sun gear 914 for common rotation therewith. The second ring gear 930 is coupled to the input shaft 902 for common rotation therewith. The second carrier member 932 is coupled for common rotation with the fourth shaft 936.

The third sun gear 938 of the third planetary gearset 910 is coupled to the sixth shaft 936 for common rotation therewith. The third ring gear 940 is coupled to the fifth shaft 948 for common rotation therewith. Third pinion gears 944 are configured to intermesh with the third sun gear 938 and third ring gear 940, respectively. The third carrier member 942 is coupled for common rotation with the third shaft 926, the first carrier member 918 and fourth ring gear 952.

The kinematic relationship of the fourth planetary gearset 912 is such that the fourth sun gear 950 is coupled to the sixth shaft 948 and third sun gear 938 for common rotation therewith. The fourth ring gear 952 is coupled to the third shaft 926, first carrier member 918, and third carrier member 942 for common rotation therewith. The fourth pinion gears 956 are configured to intermesh with the fourth sun gear 950 and the fourth ring gear 952. The fourth carrier member 954 is coupled to the output shaft 904 for common rotation therewith.

With regards to the kinematic coupling of the five torque-transmitting mechanisms to the previously described shafts, the multiple speed transmission 900 of FIG. 9 provides that the first torque-transmitting mechanism 958 is arranged within the power flow between the first shaft 922 and a housing G of the transmission 900. In this manner, the first torque-transmitting mechanism 958 is configured to act as a brake. The second torque-transmitting mechanism 960 is arranged within the power flow between the second shaft 924 and the housing G of the transmission 900. In this manner, the second torque-transmitting mechanism 960 is configured to act as a brake. In this embodiment of the transmission 900 therefore two of the five torque-transmitting mechanisms are configured to act as a brake and the other three torque-transmitting mechanisms are configured to act as clutches.

The third torque-transmitting mechanism 962, for example, is arranged within the power flow between the input shaft 902 and the sixth shaft 948. The fourth torque-transmitting mechanism 964 is arranged within the power flow between the fourth shaft 936 and the fifth shaft 946. Moreover, the fifth torque-transmitting mechanism 966 is arranged within the power flow between the fourth shaft 936 and the sixth shaft 948.

The kinematic couplings of the embodiment in FIG. 9 can further be described with respect to the selective engagement of the torque-transmitting mechanisms with respect to one or more components of the plurality of planetary gearsets. For example, in the transmission 900, the first torque-transmitting mechanism 958 is selectively engageable to couple the first sun gear 914, the second sun gear 928, and the first shaft 922 to the housing G of the transmission 900. The second torque-transmitting mechanism 960 is selectively engageable to couple the first ring gear 916 and the second shaft 924 to the housing G of the transmission 900. Moreover, the third torque-transmitting mechanism 962 is selectively engageable to couple input shaft 902 and the second ring gear 930 to the sixth shaft 948, the third sun gear 938, and fourth sun gear 950. The fourth torque-transmitting mechanism 964 is selectively engageable to couple the second carrier member 932 and the fourth shaft 936 to the fifth shaft 946 and third ring gear 940. Lastly, the fifth torque-transmitting mechanism 966 is selectively engageable to couple the second carrier member 932 and the fourth shaft 936 to the sixth shaft 948, the third sun gear 938, and fourth sun gear 950.

Figure 10:
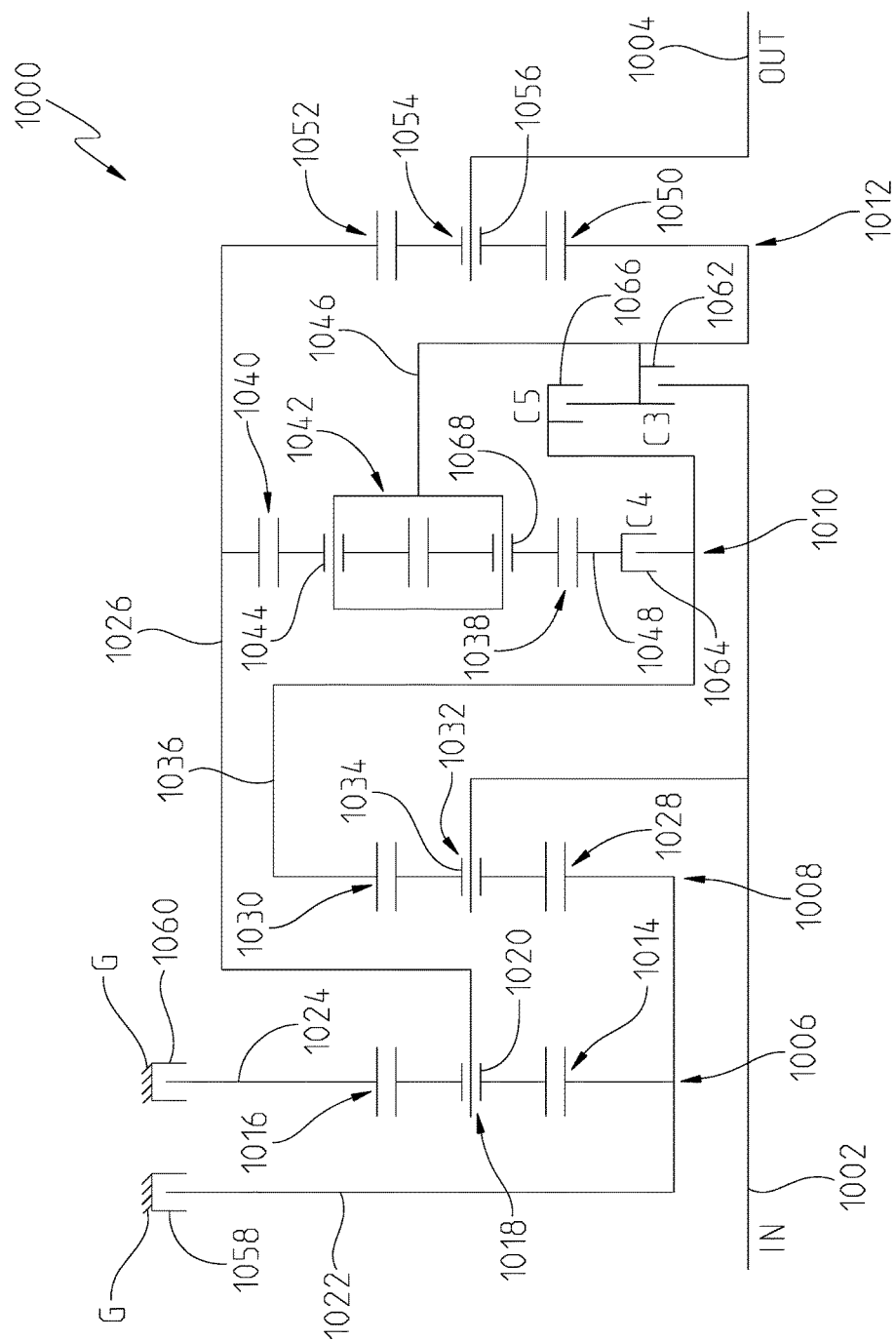
FIG. 10 is a diagrammatic view of a ninth embodiment of a multiple speed transmission.

Referring to FIG. 10, a schematic representation or stick diagram illustrates a different embodiment of a multi-speed transmission 1000 according to the present disclosure. The transmission 1000 includes an input shaft 1002 and an output shaft 1004. The input shaft 1002 and output shaft 1004 can be disposed along the same axis or centerline of the transmission 1000. In another aspect, the different shafts can be disposed along different axes or centerlines. In a further aspect, the different shafts can be disposed parallel to one another, but along different axes or centerlines. Other aspect can be appreciated by one skilled in the art.

The transmission 1000 can also include a plurality of planetary gearsets. In the illustrated embodiment of FIG. 10, the transmission 1000 includes a first planetary gearset 1006, a second planetary gearset 1008, a third planetary gearset 1010, and a fourth planetary gearset 1012. Each planetary gearset can be referred to as a simple or compound planetary gearset. For example, in some aspects, one or more of the plurality of planetary gearsets can be formed as an idler planetary gearset. In FIG. 10, for instance, the third planetary gearset 1010 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 1000, but for sake of simplicity and in this particular example only, the planetary gearsets are aligned in an axial direction consecutively in sequence (i.e., first, second, third, and fourth between the input and output shafts).

The transmission 1000 may also include a plurality of torque-transmitting or gearshifting mechanisms. For example, one or more of these mechanisms can include a clutch or brake. In one aspect, each of the plurality of mechanisms is disposed within an outer housing of the transmission 1000. In another aspect, however, one or more of the mechanisms may be disposed outside of the housing. Each of the plurality of mechanisms can be coupled to one or more of the plurality of planetary gearsets, which will be described further below.

In the embodiment of FIG. 10, the transmission 1000 can include a first torque-transmitting mechanism 1058 and a second torque-transmitting mechanism 1060 that are configured to function as brakes (e.g., the torque-transmitting mechanism is fixedly coupled to the outer housing of the transmission 1000). Each brake can be configured as a shiftable-friction-locked disk brake, shiftable friction-locked band brake, shiftable form-locking claw or conical brake, or any other type of known brake. The transmission 1000 can include a third torque-transmitting mechanism 1062, a fourth torque-transmitting mechanism 1064, and a fifth torque-transmitting mechanism 1066 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 1000 of FIG. 10 may also include up to eight different shafts, which is inclusive of the input shaft 1002 and output shaft 1004. Each of these shafts, designated as a first shaft 1022, a second shaft 1024, a third shaft 1026, a fourth shaft 1036, a fifth shaft 1046, and a sixth shaft 1048, are configured to be connected to one or more of the plurality of planetary gearsets or plurality of torque-transmitting mechanism between the input shaft 1002 and output shaft 1004.

In FIG. 10, the first planetary gearset 1006 can include a first sun gear 1014, a first ring gear 1016, and a first carrier member 1018 that rotatably supports a set of pinion gears 1020. The second planetary gearset 1008 can include a second sun gear 1028, a second ring gear 1030, and a second carrier member 1032 that rotatably supports a set of pinion gears 1034. The third planetary gearset 1010, i.e., the idler planetary gearset, can include a third sun gear 1038, a third ring gear 1040, and a third carrier member 1042 that rotatably supports two sets of pinion gears. One set of pinion gears 1068 is rotationally coupled to the sun gear 1038 and the other set of pinion gears 1044 is rotationally coupled to the ring gear 1040. The fourth planetary gearset 1012 can include a fourth sun gear 1050, a fourth ring gear 1052, and a fourth carrier member 1054 that rotatably supports a set of pinion gears 1056.

The transmission 1000 is capable of transferring torque from the input shaft 1002 to the output shaft 1004 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 1058, 1060, 1062, 1064, and 1066). Those skilled in the art will readily understand that a different speed ratio is associated with each torque ratio. Thus, at least eight forward speed ratios and at least one reverse speed ratio may be attained by transmission 1000.

As for the transmission 1000, kinematic coupling of the first planetary gearset 1006 is shown in FIG. 10. The first sun gear 1014 is coupled to the first shaft 1022 for common rotation therewith. The first carrier member 1018 is coupled to the third shaft 1026 for common rotation therewith. First ring gear 1016 is coupled for common rotation with the second shaft 1024.

With respect to the second planetary gearset 1008, the second sun gear 1028 is coupled to the first shaft 1022 and first sun gear 1014 for common rotation therewith. The second ring gear 1030 is coupled to the fourth shaft 1036 for common rotation therewith. The second carrier member 1032 is coupled for common rotation with the input shaft 1002.

The third sun gear 1038 of the third planetary gearset 1010 is coupled to the sixth shaft 1048 for common rotation therewith. The third ring gear 1040 is coupled to the third shaft 1026 for common rotation therewith. The third carrier member 1042 is coupled for common rotation with the fifth shaft 1046.

The kinematic relationship of the fourth planetary gearset 1012 is such that the fourth sun gear 1050 is coupled to the fifth shaft 1046 and third carrier member 1042 for common rotation therewith. The fourth ring gear 1052 is coupled to the third shaft 1026, first carrier member 1018, and third ring gear 1040 for common rotation therewith. The fourth pinion gears 1056 are configured to intermesh with the fourth sun gear 1050 and the fourth ring gear 1052. The fourth carrier member 1054 is coupled to the output shaft 1004 for common rotation therewith.

With regards to the kinematic coupling of the five torque-transmitting mechanisms to the previously described shafts, the multiple speed transmission 1000 of FIG. 10 provides that the first torque-transmitting mechanism 1058 is arranged within the power flow between the first shaft 1022 and a housing G of the transmission 1000. In this manner, the first torque-transmitting mechanism 1058 is configured to act as a brake. The second torque-transmitting mechanism 1060 is arranged within the power flow between the second shaft 1024 and the housing G of the transmission 1000. In this manner, the second torque-transmitting mechanism 1060 is configured to act as a brake. In this embodiment of the transmission 1000 therefore two of the five torque-transmitting mechanisms are configured to act as a brake and the other three torque-transmitting mechanisms are configured to act as clutches.

The third torque-transmitting mechanism 1062, for example, is arranged within the power flow between the input shaft 1002 and the fifth shaft 1046. The fourth torque-transmitting mechanism 1064 is arranged within the power flow between the fourth shaft 1036 and the sixth shaft 1048. Moreover, the fifth torque-transmitting mechanism 1066 is arranged within the power flow between the fourth shaft 1036 and the fifth shaft 1046.

The kinematic couplings of the embodiment in FIG. 10 can further be described with respect to the selective engagement of the torque-transmitting mechanisms with respect to one or more components of the plurality of planetary gearsets. For example, in the transmission 1000, the first torque-transmitting mechanism 1058 is selectively engageable to couple the first sun gear 1014, the second sun gear 1028, and the first shaft 1022 to the housing G of the transmission 1000. The second torque-transmitting mechanism 1060 is selectively engageable to couple the first ring gear 1016 and the second shaft 1024 to the housing G of the transmission 1000. Moreover, the third torque-transmitting mechanism 1062 is selectively engageable to couple input shaft 1002 and the second carrier member 1032 to the fifth shaft 1046, the third carrier member 1042, and fourth sun gear 1050. The fourth torque-transmitting mechanism 1064 is selectively engageable to couple the third sun gear 1038 and the sixth shaft 1048 to the fourth shaft 1036 and second ring gear 1030. Lastly, the fifth torque-transmitting mechanism 1066 is selectively engageable to couple the second ring gear 1030 and the fourth shaft 1036 to the fifth shaft 1046, the third carrier member 1042, and fourth sun gear 1050.

Figure 11:
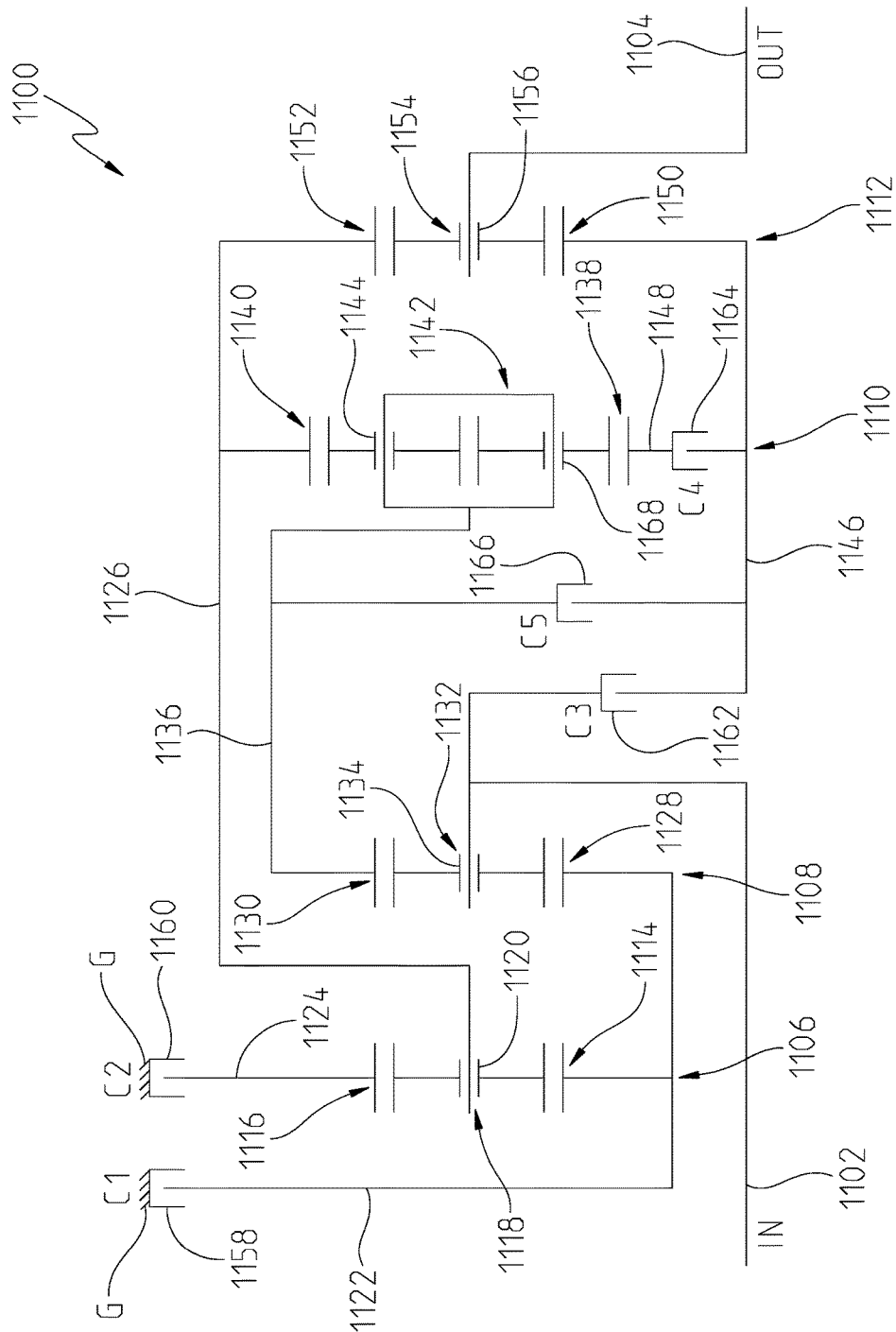
FIG. 11 is a diagrammatic view of a tenth embodiment of a multiple speed transmission.

Referring to FIG. 11, a schematic representation or stick diagram illustrates a further embodiment of a multi-speed transmission 1100 according to the present disclosure. The transmission 1100 includes an input shaft 1102 and an output shaft 1104. The input shaft 1102 and output shaft 1104 can be disposed along the same axis or centerline of the transmission 1100. In another aspect, the different shafts can be disposed along different axes or centerlines. In a further aspect, the different shafts can be disposed parallel to one another, but along different axes or centerlines. Other aspect can be appreciated by one skilled in the art.

The transmission 1100 can also include a plurality of planetary gearsets. In the illustrated embodiment of FIG. 11, the transmission 1100 includes a first planetary gearset 1106, a second planetary gearset 1108, a third planetary gearset 1110, and a fourth planetary gearset 1112. Each planetary gearset can be referred to as a simple or compound planetary gearset. For example, in some aspects, one or more of the plurality of planetary gearsets can be formed as an idler planetary gearset. In FIG. 11, for instance, the third planetary gearset 1110 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 1100, but for sake of simplicity and in this particular example only, the planetary gearsets are aligned in an axial direction consecutively in sequence (i.e., first, second, third, and fourth between the input and output shafts).

The transmission 1100 may also include a plurality of torque-transmitting or gearshifting mechanisms. For example, one or more of these mechanisms can include a clutch or brake. In one aspect, each of the plurality of mechanisms is disposed within an outer housing of the transmission 1100. In another aspect, however, one or more of the mechanisms may be disposed outside of the housing. Each of the plurality of mechanisms can be coupled to one or more of the plurality of planetary gearsets, which will be described further below.

In the embodiment of FIG. 11, the transmission 1100 can include a first torque-transmitting mechanism 1158 and a second torque-transmitting mechanism 1160 that are configured to function as brakes (e.g., the torque-transmitting mechanism is fixedly coupled to the outer housing of the transmission 1100). Each brake can be configured as a shiftable-friction-locked disk brake, shiftable friction-locked band brake, shiftable form-locking claw or conical brake, or any other type of known brake. The transmission 1100 can include a third torque-transmitting mechanism 1162, a fourth torque-transmitting mechanism 1164, and a fifth torque-transmitting mechanism 1166 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 1100 of FIG. 11 may also include up to eight different shafts, which is inclusive of the input shaft 1102 and output shaft 1104. Each of these shafts, designated as a first shaft 1122, a second shaft 1124, a third shaft 1126, a fourth shaft 1136, a fifth shaft 1146, and a sixth shaft 1148, are configured to be connected to one or more of the plurality of planetary gearsets or plurality of torque-transmitting mechanism between the input shaft 1102 and output shaft 1104.

In FIG. 11, the first planetary gearset 1106 can include a first sun gear 1114, a first ring gear 1116, and a first carrier member 1118 that rotatably supports a set of pinion gears 1120. The second planetary gearset 1108 can include a second sun gear 1128, a second ring gear 1130, and a second carrier member 1132 that rotatably supports a set of pinion gears 1134. The third planetary gearset 1110, i.e., the idler planetary gearset, can include a third sun gear 1138, a third ring gear 1140, and a third carrier member 1142 that rotatably supports two sets of pinion gears. One set of pinion gears 1168 is rotationally coupled to the sun gear 1138 and the other set of pinion gears 1144 is rotationally coupled to the ring gear 1140. The fourth planetary gearset 1112 can include a fourth sun gear 1150, a fourth ring gear 1152, and a fourth carrier member 1154 that rotatably supports a set of pinion gears 1156.

The transmission 1100 is capable of transferring torque from the input shaft 1102 to the output shaft 1104 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 1158, 1160, 1162, 1164, and 1166). Those skilled in the art will readily understand that a different speed ratio is associated with each torque ratio. Thus, at least eight forward speed ratios and at least one reverse speed ratio may be attained by transmission 1100.

As for the transmission 1100, kinematic coupling of the first planetary gearset 1106 is shown in FIG. 11. The first sun gear 1114 is coupled to the first shaft 1122 for common rotation therewith. The first carrier member 1118 is coupled to the third shaft 1126 for common rotation therewith. First ring gear 1116 is coupled for common rotation with the second shaft 1124.

With respect to the second planetary gearset 1108, the second sun gear 1128 is coupled to the first shaft 1122 and first sun gear 1114 for common rotation therewith. The second ring gear 1130 is coupled to the fourth shaft 1136 for common rotation therewith. The second carrier member 1132 is coupled for common rotation with the input shaft 1102.

The third sun gear 1138 of the third planetary gearset 1110 is coupled to the sixth shaft 1148 for common rotation therewith. The third ring gear 1140 is coupled to the third shaft 1126 for common rotation therewith. Third pinion gears 1144 are configured to intermesh with the third ring gear 1140 as described above. The third carrier member 1142 is coupled for common rotation with the fourth shaft 1136.

The kinematic relationship of the fourth planetary gearset 1112 is such that the fourth sun gear 1150 is coupled to the fifth shaft 1146 for common rotation therewith. The fourth ring gear 1152 is coupled to the third shaft 1126, first carrier member 1118, and third ring gear 1140 for common rotation therewith. The fourth pinion gears 1156 are configured to intermesh with the fourth sun gear 1150 and the fourth ring gear 1152. The fourth carrier member 1154 is coupled to the output shaft 1104 for common rotation therewith.

With regards to the kinematic coupling of the five torque-transmitting mechanisms to the previously described shafts, the multiple speed transmission 1100 of FIG. 11 provides that the first torque-transmitting mechanism 1158 is arranged within the power flow between the first shaft 1122 and a housing G of the transmission 1100. In this manner, the first torque-transmitting mechanism 1158 is configured to act as a brake. The second torque-transmitting mechanism 1160 is arranged within the power flow between the second shaft 1124 and the housing G of the transmission 1100. In this manner, the second torque-transmitting mechanism 1160 is configured to act as a brake. In this embodiment of the transmission 1100 therefore two of the five torque-transmitting mechanisms are configured to act as a brake and the other three torque-transmitting mechanisms are configured to act as clutches.

The third torque-transmitting mechanism 1162, for example, is arranged within the power flow between the input shaft 1102 and the fifth shaft 1146. The fourth torque-transmitting mechanism 1164 is arranged within the power flow between the fifth shaft 1146 and the sixth shaft 1148. Moreover, the fifth torque-transmitting mechanism 1166 is arranged within the power flow between the fourth shaft 1136 and the fifth shaft 1146.

The kinematic couplings of the embodiment in FIG. 11 can further be described with respect to the selective engagement of the torque-transmitting mechanisms with respect to one or more components of the plurality of planetary gearsets. For example, in the transmission 1100, the first torque-transmitting mechanism 1158 is selectively engageable to couple the first sun gear 1114, the second sun gear 1128, and the first shaft 1122 to the housing G of the transmission 1100. The second torque-transmitting mechanism 1160 is selectively engageable to couple the first ring gear 1116 and the second shaft 1124 to the housing G of the transmission 1100. Moreover, the third torque-transmitting mechanism 1162 is selectively engageable to couple input shaft 1102 and the second carrier member 1132 to the fifth shaft 1146 and fourth sun gear 1150. The fourth torque-transmitting mechanism 1164 is selectively engageable to couple the third sun gear 1138 and the sixth shaft 1148 to the fifth shaft 1146 and fourth sun gear 1150. Lastly, the fifth torque-transmitting mechanism 1166 is selectively engageable to couple the second ring gear 1130 and the fourth shaft 1136 to the fifth shaft 1146 and fourth sun gear 1150.

Figure 12:
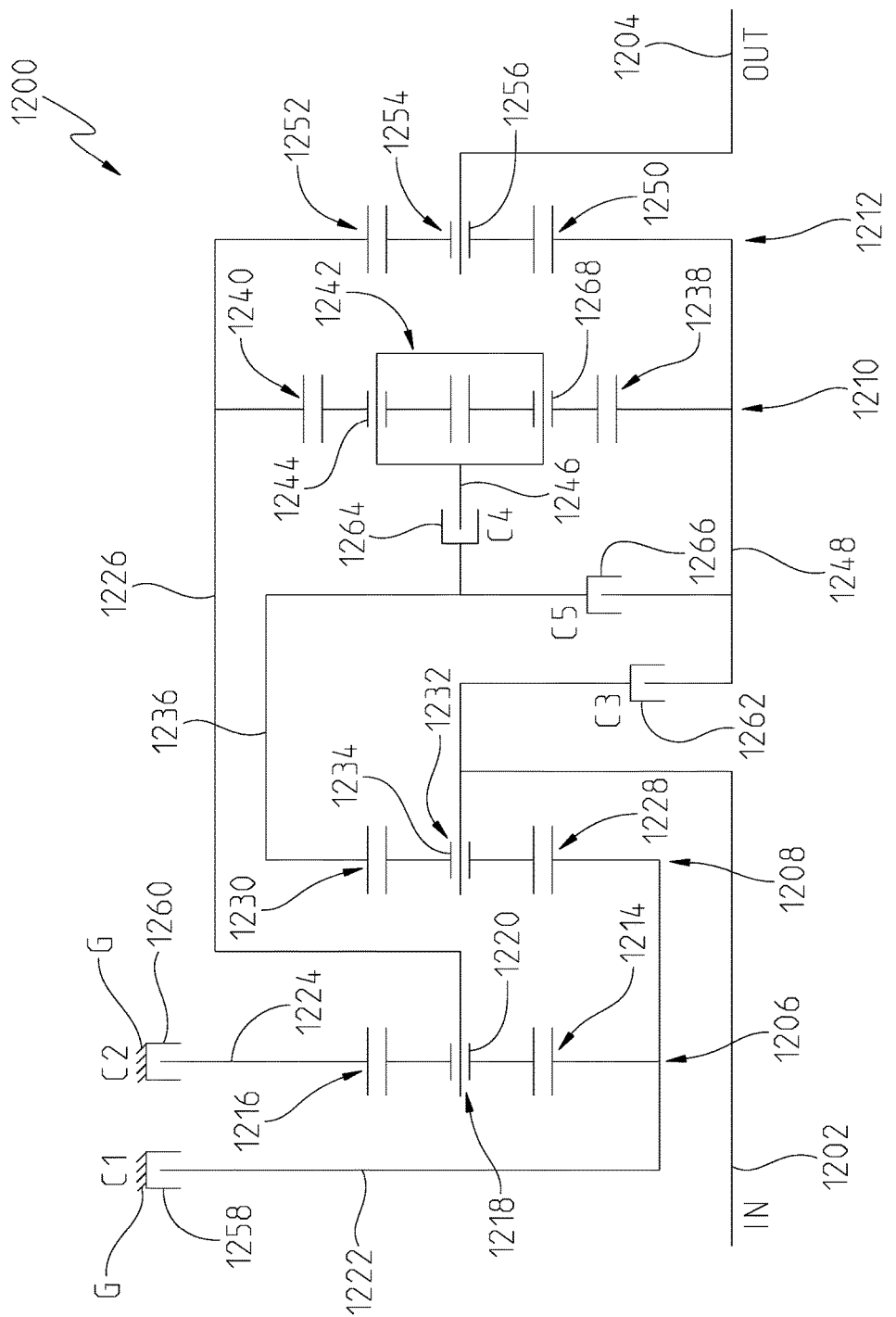
FIG. 12 is a diagrammatic view of an eleventh embodiment of a multiple speed transmission.

Referring to FIG. 12, a schematic representation or stick diagram illustrates yet another embodiment of a multi-speed transmission 1200 according to the present disclosure. The transmission 1200 includes an input shaft 1202 and an output shaft 1204. The input shaft 1202 and output shaft 1204 can be disposed along the same axis or centerline of the transmission 1200. In another aspect, the different shafts can be disposed along different axes or centerlines. In a further aspect, the different shafts can be disposed parallel to one another, but along different axes or centerlines. Other aspect can be appreciated by one skilled in the art.

The transmission 1200 can also include a plurality of planetary gearsets. In the illustrated embodiment of FIG. 12, the transmission 1200 includes a first planetary gearset 1206, a second planetary gearset 1208, a third planetary gearset 1210, and a fourth planetary gearset 1212. Each planetary gearset can be referred to as a simple or compound planetary gearset. For example, in some aspects, one or more of the plurality of planetary gearsets can be formed as an idler planetary gearset. In FIG. 12, for instance, the third planetary gearset 1210 is structurally set forth as an idler planetary gearset. In this example, an idler planet planetary gearset can include a sun gear, a ring gear, a carrier, and two sets of pinion gears. One set of pinion gears can be rotationally coupled with the sun gear and the other set of pinion gears can be rotationally coupled to the ring gear. Both sets of pinion gears are coupled to one another such that one pinion gear of the first set is rotationally coupled to one pinion gear of the second set. In this manner, power can be transferred through the sun or ring gear via each of the sets of pinion gears.

One or more of the plurality of planetary gearsets can be arranged in different locations within the transmission 1200, but for sake of simplicity and in this particular example only, the planetary gearsets are aligned in an axial direction consecutively in sequence (i.e., first, second, third, and fourth between the input and output shafts).

The transmission 1200 may also include a plurality of torque-transmitting or gearshifting mechanisms. For example, one or more of these mechanisms can include a clutch or brake. In one aspect, each of the plurality of mechanisms is disposed within an outer housing of the transmission 1200. In another aspect, however, one or more of the mechanisms may be disposed outside of the housing.

Each of the plurality of mechanisms can be coupled to one or more of the plurality of planetary gearsets, which will be described further below.

In the embodiment of FIG. 12, the transmission 1200 can include a first torque-transmitting mechanism 1258 and a second torque-transmitting mechanism 1260 that are configured to function as brakes (e.g., the torque-transmitting mechanism is fixedly coupled to the outer housing of the transmission 1200). Each brake can be configured as a shiftable-friction-locked disk brake, shiftable friction-locked band brake, shiftable form-locking claw or conical brake, or any other type of known brake. The transmission 1200 can include a third torque-transmitting mechanism 1262, a fourth torque-transmitting mechanism 1264, and a fifth torque-transmitting mechanism 1266 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 1200 of FIG. 12 may also include up to eight different shafts, which is inclusive of the input shaft 1202 and output shaft 1204. Each of these shafts, designated as a first shaft 1222, a second shaft 1224, a third shaft 1226, a fourth shaft 1236, a fifth shaft 1246, and a sixth shaft 1248, are configured to be connected to one or more of the plurality of planetary gearsets or plurality of torque-transmitting mechanism between the input shaft 1202 and output shaft 1204.

In FIG. 12, the first planetary gearset 1206 can include a first sun gear 1214, a first ring gear 1216, and a first carrier member 1218 that rotatably supports a set of pinion gears 1220. The second planetary gearset 1208 can include a second sun gear 1228, a second ring gear 1230, and a second carrier member 1232 that rotatably supports a set of pinion gears 1234. The third planetary gearset 1210, i.e., the idler planetary gearset, can include a third sun gear 1238, a third ring gear 1240, and a third carrier member 1242 that rotatably supports two sets of pinion gears. One set of pinion gears 1268 is rotationally coupled to the sun gear 1238 and the other set of pinion gears 1244 is rotationally coupled to the ring gear 1240. The fourth planetary gearset 1212 can include a fourth sun gear 1250, a fourth ring gear 1252, and a fourth carrier member 1254 that rotatably supports a set of pinion gears 1256.

The transmission 1200 is capable of transferring torque from the input shaft 1202 to the output shaft 1204 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 1258, 1260, 1262, 1264, and 1266). Those skilled in the art will readily understand that a different speed ratio is associated with each torque ratio. Thus, at least eight forward speed ratios and at least one reverse speed ratio may be attained by transmission 1200.

As for the transmission 1200, kinematic coupling of the first planetary gearset 1206 is shown in FIG. 12. The first sun gear 1214 is coupled to the first shaft 1222 for common rotation therewith. The first carrier member 1218 is coupled to the third shaft 1226 for common rotation therewith. First ring gear 1216 is coupled for common rotation with the second shaft 1224.

With respect to the second planetary gearset 1208, the second sun gear 1228 is coupled to the first shaft 1222 and first sun gear 1214 for common rotation therewith. The second ring gear 1230 is coupled to the fourth shaft 1236 for common rotation therewith. The second carrier member 1232 is coupled for common rotation with the input shaft 1202.

The third sun gear 1238 of the third planetary gearset 1210 is coupled to the sixth shaft 1248 for common rotation therewith. The third ring gear 1240 is coupled to the third shaft 1226 for common rotation therewith. Third pinion gears 1244 are configured to intermesh with the third ring gear 1240. The third carrier member 1242 is coupled for common rotation with the fifth shaft 1246.

The kinematic relationship of the fourth planetary gearset 1212 is such that the fourth sun gear 1250 is coupled to the sixth shaft 1248 for common rotation therewith. The fourth ring gear 1252 is coupled to the third shaft 1226, first carrier member 1218, and third ring gear 1240 for common rotation therewith. The fourth pinion gears 1256 are configured to intermesh with the fourth sun gear 1250 and the fourth ring gear 1252. The fourth carrier member 1254 is coupled to the output shaft 1204 for common rotation therewith.

With regards to the kinematic coupling of the five torque-transmitting mechanisms to the previously described shafts, the multiple speed transmission 1200 of FIG. 12 provides that the first torque-transmitting mechanism 1258 is arranged within the power flow between the first shaft 1222 and a housing G of the transmission 1200. In this manner, the first torque-transmitting mechanism 1258 is configured to act as a brake. The second torque-transmitting mechanism 1260 is arranged within the power flow between the second shaft 1224 and the housing G of the transmission 1200. In this manner, the second torque-transmitting mechanism 1260 is configured to act as a brake. In this embodiment of the transmission 1200 therefore two of the five torque-transmitting mechanisms are configured to act as a brake and the other three torque-transmitting mechanisms are configured to act as clutches.

The third torque-transmitting mechanism 1262, for example, is arranged within the power flow between the input shaft 1202 and the sixth shaft 1248. The fourth torque-transmitting mechanism 1264 is arranged within the power flow between the fourth shaft 1236 and the fifth shaft 1146. Moreover, the fifth torque-transmitting mechanism 1266 is arranged within the power flow between the fourth shaft 1236 and the sixth shaft 1248.

The kinematic couplings of the embodiment in FIG. 12 can further be described with respect to the selective engagement of the torque-transmitting mechanisms with respect to one or more components of the plurality of planetary gearsets. For example, in the transmission 1200, the first torque-transmitting mechanism 1258 is selectively engageable to couple the first sun gear 1214, the second sun gear 1228, and the first shaft 1222 to the housing G of the transmission 1200. The second torque-transmitting mechanism 1260 is selectively engageable to couple the first ring gear 1216 and the second shaft 1224 to the housing G of the transmission 1200. Moreover, the third torque-transmitting mechanism 1262 is selectively engageable to couple input shaft 1202 and the second carrier member 1232 to the sixth shaft 1248, the third sun gear 1238, and fourth sun gear 1250. The fourth torque-transmitting mechanism 1264 is selectively engageable to couple the second ring gear 1230 and the fourth shaft 1236 to the fifth shaft 1246 and third carrier member 1242. Lastly, the fifth torque-transmitting mechanism 1266 is selectively engageable to couple the second ring gear 1230 and the fourth shaft 1236 to the sixth shaft 1248, the third sun gear 1238, and fourth sun gear 1250.

As previously described, the aforementioned embodiment is capable of transmitting torque from a respective input shaft to a respective output shaft in at least eight forward torque ratios and one reverse torque ratio. Referring to FIGS. 13 and 14, two examples of truth tables 1300, 1400 are shown representing a state of engagement of various torque transmitting mechanisms in each of the available forward and reverse speeds or gear ratios of the transmissions illustrated in FIGS. 2-12. In particular, the truth table in FIG. 13 may correspond with the architectures illustrated in FIGS. 2-3, 5-7, and 9-12, whereas the truth table in FIG. 14 may correspond with the architectures illustrated in FIGS. 4 and 8. It is to be understood that FIG. 13 and FIG. 14 provide only examples of any number of truth tables possible for achieving at least eight forward ratios and one reverse ratio, and one skilled in the art is capable of configuring diameters, gear tooth counts, and gear configurations to achieve other ratios.

In the example of FIG. 13, the reverse ratio (rev) can be achieved by the selective engagement of the torque-transmitting mechanisms as set forth in the table. As shown, the first torque transmitting mechanism (B1), second torque-transmitting mechanism (B2), and fourth torque-transmitting mechanism (C4) are selectively engaged to establish the reverse ratio. Thus, in transmission 200 of FIG. 2, the selective engagement of mechanisms 258, 260, and 264 can establish the reverse ratio.

In neutral (Neu), none of the torque-transmitting mechanisms carry torque. One or more of the torque-transmitting mechanisms, however, may be engaged in neutral but not carrying torque. For example, the first and fourth torque-transmitting mechanisms can be engaged in neutral, thereby resulting in the fifth torque-transmitting mechanism being disengaged between a shift between the one reverse ratio and neutral.

A first forward ratio (shown as 1st) in the table of FIG. 13 is achieved by engaging both brakes and one of the clutches. In FIG. 2, for example, the first torque-transmitting mechanism 258, the second torque-transmitting mechanism 260, and the third torque-transmitting mechanism 262 are engaged. Thus, when transitioning between neutral and the first forward range, the first and second torque-transmitting mechanisms may already be engaged, and the third torque-transmitting mechanism is selectively engaged.

In a second or subsequent forward ratio, indicated as 2nd in FIG. 13, the first torque-transmitting mechanism, the second torque-transmitting mechanism, and the fifth torque-transmitting mechanism are selectively engaged. Therefore, when transitioning between the first forward ratio and the second forward ratio, the third torque-transmitting mechanism is released and the fifth torque-transmitting mechanism is engaged.

In a third or subsequent forward ratio, indicated as 3rd forward ratio in FIG. 13, the second torque-transmitting mechanism, third torque-transmitting mechanism, and fifth torque-transmitting mechanism are engaged. To transition from the second forward ratio to the third forward ratio, for example, the first torque-transmitting mechanism is released and the third torque-transmitting mechanism is engaged.

In a fourth or the next subsequent forward ratio, indicated as 4th in FIG. 13, the second torque-transmitting mechanism, fourth torque-transmitting mechanism, and fifth torque-transmitting mechanism are engaged. Thus, to transition from the third forward ratio and upshift to the fourth forward ratio, the third torque-transmitting mechanism is released and the fourth torque-transmitting mechanism is engaged.

In a fifth or the next subsequent forward ratio, indicated as 5th in FIG. 13, the second torque-transmitting mechanism, third torque-transmitting mechanism, and fourth torque-transmitting mechanism are engaged. Thus, to transition from the fourth forward ratio and upshift to the fifth forward ratio, the fifth torque-transmitting mechanism is released and the third torque-transmitting mechanism is engaged.

In a sixth or the next subsequent forward ratio, indicated as 6th in FIG. 13, the third torque-transmitting mechanism, fourth torque-transmitting mechanism, and fifth torque-transmitting mechanism are engaged. Thus, to transition from the fifth forward ratio and upshift to the sixth forward ratio, the second torque-transmitting mechanism is released and the fifth torque-transmitting mechanism is engaged.

In a seventh or the next subsequent forward ratio, indicated as 7th in FIG. 13, the first torque-transmitting mechanism, third torque-transmitting mechanism, and fourth torque-transmitting mechanism are engaged. Thus, to transition from the sixth forward ratio and upshift to the seventh forward ratio, the fifth torque-transmitting mechanism is released and the first torque-transmitting mechanism is engaged.

In an eighth or the next subsequent forward ratio, indicated as 8th in FIG. 13, the first torque-transmitting mechanism, fourth torque-transmitting mechanism, and fifth torque-transmitting mechanism are engaged. Thus, to transition from the seventh forward ratio and upshift to the eighth forward ratio, the third torque-transmitting mechanism is released and the fifth torque-transmitting mechanism is engaged.

With respect to the truth table 1400 in FIG. 4, similar transitions between ranges occurs. In other words, when upshifting or downshifting between successive forward ranges, at least one torque-transmitting mechanism is engaged and another torque-transmitting mechanism is released. The present disclosure further contemplates that downshifts follow the reverse sequence of the corresponding upshift (as described above), and several power-on skip-shifts that are single-transition are possible (e.g. from 1st to 3rd or 3rd to 1st).

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multiple speed transmission, comprising:
an input member;
an output member;
first, second, third and fourth planetary gearsets each having first, second and third members;
a plurality of interconnecting members each connected between at least one of the first, second, third, and fourth planetary gearsets and at least another of the first, second, third, and fourth planetary gearsets;
a first torque-transmitting mechanism selectively engageable to interconnect the first member of the first planetary gearset and the first member of the second planetary gearset with a stationary member;

a second torque-transmitting mechanism selectively engageable to interconnect the third member of the first planetary gearset with the stationary member;

a third torque-transmitting mechanism selectively engageable to interconnect the third member of the second planetary gearset with the first member of the fourth planetary gearset;

a fourth torque-transmitting mechanism selectively engageable to interconnect the first member of the third planetary gearset with the first member of the fourth planetary gearset; and a fifth torque-transmitting mechanism selectively engageable to interconnect the second member of the second planetary gearset and the third member of the third planetary gearset with the first member of the fourth planetary gearset;

wherein the torque transmitting mechanisms are selectively engageable in combinations of at least three to establish at least eight forward speed ratios and at least one reverse speed ratio between the input member and the output member.

2. The multiple speed transmission of claim 1, wherein the input member is continuously interconnected with the third member of the second planetary gearset and the output member is continuously interconnected with the second member of the fourth planetary gearset.

3. The multiple speed transmission of claim 1, wherein the plurality of interconnecting members includes a first interconnecting member continuously interconnecting the first member of the first planetary gearset with the first member of the second planetary gearset.

4. The multiple speed transmission of claim 1, wherein the plurality of interconnecting members includes a second interconnecting member directly connected to the third member of the first planetary gearset.

5. The multiple speed transmission of claim 1, wherein the plurality of interconnecting members includes a third interconnecting member continuously interconnecting the second member of the first planetary gearset with the second member of the third planetary gearset and the third member of the fourth planetary gearset.

6. The multiple speed transmission of claim 1, wherein the plurality of interconnecting members includes a fourth interconnecting member continuously interconnecting the second member of the second planetary gearset with the third member of the third planetary gearset.

7. The multiple speed transmission of claim 1, wherein the plurality of interconnecting members includes a fifth interconnecting member directly connected to the first member of the fourth planetary gearset.

8. The multiple speed transmission of claim 1, wherein the plurality of interconnecting members includes a sixth interconnecting member directly connected to the first member of the third planetary gearset.

9. The multiple speed transmission of claim 1, wherein the second planetary gearset comprises an idler planetary gearset having a first set of pinion gears and a second set of pinion gears.

10. A multiple speed transmission, comprising:
an input member;
an output member;
first, second, third and fourth planetary gearsets each having a sun gear, a carrier member, and a ring gear;
a plurality of interconnecting members each connected between at least one of the first, second, third, and fourth planetary gearsets and at least another of the first, second, third, and fourth planetary gearsets;

a first torque-transmitting mechanism selectively engageable to interconnect the sun gear of the first planetary gearset and the sun gear of the second planetary gearset with a stationary member;

a second torque-transmitting mechanism selectively engageable to interconnect the ring gear of the first planetary gearset with the stationary member;

a third torque-transmitting mechanism selectively engageable to interconnect the ring gear of the second planetary gearset with the sun gear of the fourth planetary gearset;

a fourth torque-transmitting mechanism selectively engageable to interconnect the sun gear of the third planetary gearset with the sun gear of the fourth planetary gearset; and a fifth torque-transmitting mechanism selectively engageable to interconnect the carrier member of the second planetary gearset and the ring gear of the third planetary gearset with the sun gear of the fourth planetary gearset;

wherein the torque transmitting mechanisms are selectively engageable in combinations of at least three to establish at least eight forward speed ratios and at least one reverse speed ratio between the input member and the output member.

11. The multiple speed transmission of claim 10, wherein the input member is continuously interconnected with the ring gear of the second planetary gearset and the output member is continuously interconnected with the carrier member of the fourth planetary gearset.

12. The multiple speed transmission of claim 10, wherein the plurality of interconnecting members includes a first interconnecting member continuously interconnecting the sun gear of the first planetary gearset with the sun gear of the second planetary gearset.

13. The multiple speed transmission of claim 10, wherein the plurality of interconnecting members includes a second interconnecting member directly connected to the ring gear of the first planetary gearset.

14. The multiple speed transmission of claim 10, wherein the plurality of interconnecting members includes a third interconnecting member continuously interconnecting the carrier member of the first planetary gearset with the carrier member of the third planetary gearset and the ring gear of the fourth planetary gearset.

15. The multiple speed transmission of claim 10, wherein the plurality of interconnecting members includes a fourth interconnecting member continuously interconnecting the carrier member of the second planetary gearset with the ring gear of the third planetary gearset.

16. The multiple speed transmission of claim 10, wherein the plurality of interconnecting members includes a fifth interconnecting member directly connected to the sun gear of the fourth planetary gearset.

17. The multiple speed transmission of claim 10, wherein the plurality of interconnecting members includes a sixth interconnecting member directly connected to the sun gear of the third planetary gearset.

18. The multiple speed transmission of claim 10, wherein the second planetary gearset comprises an idler planetary gearset having a first set of pinion gears and a second set of pinion gears.

19. A multiple speed transmission, comprising:
an input member;
an output member;
first, second, third and fourth planetary gearsets each having a sun gear, a carrier member, and a ring gear;

a plurality of interconnecting members each connected between at least one of the first, second, third, and fourth planetary gearsets and at least another of the first, second, third, and fourth planetary gearsets;

a first torque-transmitting mechanism selectively engageable to interconnect the sun gear of the first planetary gearset and the sun gear of the second planetary gearset with a stationary member;

a second torque-transmitting mechanism selectively engageable to interconnect the ring gear of the first planetary gearset with the stationary member;

a third torque-transmitting mechanism selectively engageable to interconnect the ring gear of the second planetary gearset with the sun gear of the fourth planetary gearset;

a fourth torque-transmitting mechanism selectively engageable to interconnect the sun gear of the third planetary gearset with the sun gear of the fourth planetary gearset;

a fifth torque-transmitting mechanism selectively engageable to interconnect the carrier member of the second planetary gearset and the ring gear of the third planetary gearset with the sun gear of the fourth planetary gearset;

a first interconnecting member of the plurality of interconnecting members continuously interconnecting the sun gear of the first planetary gearset with the sun gear of the second planetary gearset;

a second interconnecting member of the plurality of interconnecting members directly connected to the ring gear of the first planetary gearset;

a third interconnecting member of the plurality of interconnecting members continuously interconnecting the carrier member of the first planetary gearset with the carrier member of the third planetary gearset and the ring gear of the fourth planetary gearset;

a fourth interconnecting member of the plurality of interconnecting members continuously interconnecting the carrier member of the second planetary gearset with the ring gear of the third planetary gearset;

a fifth interconnecting member of the plurality of interconnecting members directly connected to the sun gear of the fourth planetary gearset; and a sixth interconnecting member of the plurality of interconnecting members directly connected to the sun gear of the third planetary gearset;

wherein the torque transmitting mechanisms are selectively engageable in combinations of at least three to establish at least eight forward speed ratios and at least one reverse speed ratio between the input member and the output member.

20. The multiple speed transmission of claim 19, wherein the second planetary gearset comprises an idler planetary gearset having a first set of pinion gears and a second set of pinion gears.

* * * * *